(12) United States Patent
Nelson et al.

(10) Patent No.: US 6,732,915 B1
(45) Date of Patent: May 11, 2004

(54) SYSTEMS AND METHODS FOR CONTROLLING A PRESENTATION USING PHYSICAL OBJECTS

(75) Inventors: Lester D Nelson, Santa Clara, CA (US); Satoshi Ichimura, Palo Alto, CA (US); Elin R Pedersen, Redwood City, CA (US); Tomas Sokoler, Roskilve (DK)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/393,962

(22) Filed: Sep. 10, 1999

(51) Int. Cl.[7] .................................. G06F 17/00
(52) U.S. Cl. .................. 235/375; 235/385; 235/462.01; 235/462.15; 235/486
(58) Field of Search ................... 235/375, 462.01, 235/462.15, 385, 487, 454; 424/314, 308, 315, 317, 307 R; 345/705, 730, 732, 771

(56) References Cited

U.S. PATENT DOCUMENTS

| | | | |
|---|---|---|---|
| 4,481,412 A | * 11/1984 | Fields | 235/462.49 |
| 4,994,987 A | 2/1991 | Baldwin | 365/244 |
| 5,001,696 A | 3/1991 | Baldwin | 434/305 |
| 5,144,114 A | * 9/1992 | Wittensoldner et al. | 235/375 |
| 5,331,547 A | 7/1994 | Laszlo | 705/2 |
| 5,781,708 A | * 7/1998 | Austin et al. | 358/1.6 |
| 5,805,152 A | * 9/1998 | Furusawa | 715/500.1 |
| 5,874,724 A | 2/1999 | Cato | 235/492 |
| 5,932,863 A | * 8/1999 | Rathus et al. | 235/462.15 |
| 5,945,656 A | * 8/1999 | Lemelson et al. | 235/462.01 |
| 5,959,281 A | * 9/1999 | Domiteaux | 235/454 |
| 5,960,448 A | * 9/1999 | Reichek et al. | 707/526 |
| 5,978,777 A | * 11/1999 | Garnier | 235/375 |
| 6,195,093 B1 | * 2/2001 | Nelson et al. | 345/732 |
| 6,283,860 B1 | * 9/2001 | Lyons et al. | 463/36 |
| 6,314,569 B1 | * 11/2001 | Chernock et al. | 725/37 |
| 6,509,909 B1 | * 1/2003 | Nelson et al. | 345/732 |

FOREIGN PATENT DOCUMENTS

JP 411052901 A * 2/1999

OTHER PUBLICATIONS

"Triangles: Tangible Interface for Manipulation and Exploration of Digital Information Topography", M. Gorbet et al., Proceedings of CHI'98, ACM Press, Apr. 1998.

"Squeeze Me, Hold Me, Tilt Me! An Exploration of Manipulative User Interfaces", B. Harrison et al., CHI '98, Apr. 18–23, 1993.

A Model of the Acquisition of Menu Knowledge by Exploration, A. Howes, CHI '94.

(List continued on next page.)

Primary Examiner—Michael G. Lee
Assistant Examiner—Ahshik Kim
(74) Attorney, Agent, or Firm—Oliff & Berridge PLC

(57) ABSTRACT

A presentation control system and method to facilitate the interaction between a user and a presentation device. The user generates tangible sensible identification devices, which are linked to items to be displayed in a presentation. In use, the user places the tangible sensible identification-carrying device in the sensible area of an identification sensing device. The identification sensing device reads an identification from the identification-carrying device and determines a presentation element identified by the identification. The presentation element is then displayed via a presentation display device. Alternatively, the user generates one or more control identification devices which are linked to controllable element(s) to be controlled in a presentation. In use, the user places the controllable identification-carrying device in the sensible area of a control identification sensing device. The control identification sensing device reads a control identification from the control identification-carrying device and determines a control element identified by the identification. The function associated with the selected element is then performed.

21 Claims, 25 Drawing Sheets

OTHER PUBLICATIONS

"Passive Real–World Interface Props for Neurosurgical Visualization", K. Hinckley et al., CHI '94.

"Liveboard: A Large Interactive Display Supporting Group Meetings, Presentations and Remote Collaboration", S. Elrod et al., CHI '92, Human Factors in Computing Systems, ACM Press, pp. 599–607, Monterey.

"Bricks: Laying the Foundations for Graspable User Interfaces", G. Fitzmaurice et al., Proceedings of CHI '95, pp. 422–449, 1995.

"Situated Information Spaces and Spatially Aware Palmtop Computers", G. Fitzmaurice, CACM, 36(7), pp. 38–49, Jul. 1993.

"Triangle: Design of a Physical/Digital Construction Kit", M. Gorbet et al., Proceedings of DIS '97, Mar. 1997.

"Tilting Operations for Small Screen Interfaces (Tech Note)", J. Rekimoto, UIST '96.

"Alternative Human–Web Interaction Systems", R. Schlosser et al., http://ils.unc.edu/alternative/alternative.html.

"Design of Spatially Aware Graspable Displays", D. Small et al., Extended Abstracts of CHI '97, Mar. 22–27, 1997.

"An Overview of the Parc Tab Ubiquitous Computing Experiment", R. Want et al., IEEE Personal Communications, Dec. 1995.

"The Computer for the $21^{st}$ Century", M. Weiser, Scientific American, Sep. 1991.

"Computer–Augmented Environments: Back to the Real World", P. Weliner et al., Communications of the ACM, vol. 36, No. 7, Jul. 1993.

"Video Mosaic: Laying Out Time in a Physical Space", Wendy E. Mackay et al., Multimedia 94, pp. 165–172, Oct. 1994.

"Dual Device User Interface Design: PDAs and Interactive Television", Scott Robertson et al., INTERCHI '96, pp. 79–86, Apr. 13–18, 1996.

"Supporting Dynamic Downloadable Appearances in an Extensible User Interface Toolkit", Scott E. Hudson et al., UIST 97 Banff, pp. 159–168, 1997.

"PaperLink: A Technique of Hyperlinking from Real Paper to Electronic Content", Toshifumi Arai et al., INTERCHI '97, pp. 327–344, Mar. 22–27, 1997.

"Collaboration Using Multiple PDAs Connected to a PC", Brad A. Myers et al., CSCW 98, pp. 285–294, 1998.

"Illuminating Light: An Optical Design Tool with a Luminous–Tangible Interface", John Underkoffer et al., Proceedings of CHI '98, pp. 1–8, Apr. 18–23, 1998.

"Bridging Physical and Virtual Worlds with Electronic Tags", Roy Want et al., INTERCHI '99, pp. 370–377, May 15–20, 1999.

"PaperClipX—Summer Intern", Tomas Sokoler, http://intern99-1.pal.xerox.com:80/PaperClipX, pp. 1–2, Jun. 24, 1999.

"BiStatix Whitepaper", BiStatix Technology, http://www.mot.com/LMPS/Indala/bistatix.htm, pp. 1–9, Aug. 31, 1999.

Indala's Proximity Access Field Programming, BiStatix Technology, http://www.mot.com/LMPS/Indala/motrelease.html#bistatix, pp. 1–4, Aug. 31, 1999.

"Palette: A Paper Interface for Giving Presentations", Les Nelson et al., Proceeding of the CHI 99 Conference on Human Factors in Computing Systems, pp. 1–8, May 1999.

"Tangible Bits: Towards Seamless Interfaces Between People, Bits, and Atoms", H. Ishii et al., Chi'97, Mar. 22–27, 1997.

"Bridging the Paper and Electronic Worlds: The Paper User Interface", W. Johnson et al., INTERCHI '93, Apr. 24–29, 1993.

"Insight Lab: An Immersive Team Environment Linking Paper, Displays, and Data", B. Lange et al., CHI '98, Apr. 18–23, 1998.

"Telerobotic Control Using Augmented Reality", P. Milgram et al., IEEE International Workshop on Robot and Human Communication, 1995.

* cited by examiner

*0014*

14. WOODY RESCUED BUZZ FROM SID, AND THE TWO TOYS RAN NEXT DOOR TO BE WITH ANDY.

1. WOODY THE COWBOY DOLL WAS ANDY DAVIS' FAVORITE TOY AND BEST PAL.

1466

SYSTEMS AND METHODS FOR CONTROLLING A PRESENTATION USING PHYSICAL OBJECTS

BACKGROUND OF THE INVENTION

1. Field of Invention

This invention is related to generating and displaying presentation elements of a presentation.

2. Description of Related Art

A plethora of available software packages are very capable of accomplishing tasks such as word processing, data management and presentation authoring. Specifically, presentation authoring software allows a user to input data, which is then translated into "slides." These slides are then electronically displayed to an audience using a presentation system during a presentation to facilitate and supplement a speaker's verbal presentation.

These presentation systems allow a pre-assembled presentation to be replayed. Specifically, these presentation systems allow a user to navigate, via a graphical user interface or keyboard control, to a previous slide, a next slide or another slide within red the pre-assembled presentation or cycle through unrelated slides, i.e. skip slides, to present a more relevant slide of the presentation.

SUMMARY OF THE INVENTION

While presentation authoring software and presentation systems work well for sequential presentations, this technology can be daunting and awkward to use when a user is not capable of providing the technology with their fullest attention. Specifically, and especially in the case of a presentation using electronic media, numerous breakdowns occur in the flow of a presentation at "high-tech" conference facilities. Generally, these breakdowns result from a user having difficulty interacting with a graphical user interface of the presentation system. These breakdowns result in the audience watching and waiting while the presenter struggles with the presentation system. Such breakdowns may include the presenter searching through the file system of a general purpose computer that is running the presentation system to locate a desired presentation slide, the presenter struggling with the controls, such as mouse, keyboard or infrared pointer of the presentation system, and the presenter needing to navigate to the next or the previous slide, needing to skip unrelated slides, and needing to deal with the awkward stage at the end of a presentation when the presentation is over and the "back stage view," i.e., the presentation system's graphical user interface, is exposed to the audience.

These breakdowns are compounded by the fact that the audience is aware of and privy to the presenter's stumbling with the presentation system. Furthermore, presenters unfamiliar with the presentation system are often distracted by the audience, which detracts from the amount of attention they are able to dedicate to the presentation system. This is further compounded by presentation systems that contain complex function and/or navigation controls. Specifically, one popular presentation system contains in its presentation mode a pop-up/slide-out menu that contains 29 unique functions accessed via a graphical user interface. These 29 unique functions are organized across five separate windows that the presenter uses to control a presentation.

Accordingly, systems and methods for controlling the presentation system are needed that are more attuned to a presenter's environment and that allow the majority of a user's attention to be dedicated to tasks other than controlling the presentation system, especially when dealing with electronic media. Selecting material for viewing and subsequent display to an audience should be as simple as retrieving a transparency, yet sufficiently flexible, functional and dynamic to deal with the dynamic content afforded by available and anticipated presentation and multimedia systems.

This invention provides presentation control systems and methods that provide tangible support for arranging and controlling a view of electronic presentation content.

Specifically, an identification-carrying device is presented to a sensor of the presentation control system. The presentation control system associates the identification on the identification-carrying device with a presentation element, which is then presented for display.

This invention separately provides systems and methods for assisting users in presenting electronic media.

This invention separately provides systems and methods that allow a user to interact with a presentation system via a tangible identification-carrying device.

This invention separately provides systems and methods that allow users to create tangible identification-carrying devices containing mnemonics that represent presentation elements.

This invention additionally provides systems and methods that allow users to generate a presentation and the mnemonics associated with each presentation element within a presentation.

The presentation control systems and methods of this invention provide a user with a mechanism that provides ease of use and better support to the user during, for example, a presentation.

The presentation control systems and methods of this invention use physical objects, such as note cards, that contain or are provided with identifiers that represent presentation content. Mnemonics that are affixed to the physical object clearly express what content, e.g., a presentation slide, is represented by the object. Along with these mnemonics, users can incorporate additional notes or graphics which may supplement the mnemonic, such as notes describing the content for display, which further aid in the presentation.

The mnemonics incorporated on or attached to the physical object are L:F supplemented by a readable identification device which permits the presentation control systems and methods according to this invention to interpret a user's actions associated with the physical object. For example, a presenter may distribute a set of cards on a table or podium which contain mnemonics representing the material for presentation. The presenter can then select a card, introduce it to the sensor device of the presentation control system, and have the presentation element associated with the selected card subsequently displayed to the audience.

The presentation control systems and methods according to this invention off-load activities from the presenter's over-taxed cognitive system to under-utilized areas, such as the peripheral ranges of the presenter's senses. The presentation control systems and methods according to this invention enable a user to control a presentation system when very little attention can be dedicated to manipulating a particular user interface. The presentation control systems and methods according to this invention engage a wider range of human perception and enable a larger degree of low-intentional interaction than is found in current presentation systems and interfaces. The presentation control systems and methods of this invention recognize a direct physical action can be more efficient and reliable than interactions with a graphical user interface. For example, using the knob on a computer's speaker to adjust its loudness is more easily accomplished than finding and adjusting a slider in a control window.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Operation of the presentation control systems and methods according to this invention reduces the amount of attention required from a presenter to maintain an electronic system supporting the presentation, while allowing immediate access to an array of presentation aids. A presenter generates a set of presentation aids, or elements, such as a slide show, to supplement a presentation to be given to an audience. The presenter then associates at least one tangible, sensible object, such as a card carrying a sensible code or other identification element, with at least one presentation aid element of the presentation. The presenter thus possesses physical objects that correspond to the presentation elements. To display the presentation elements, such as slides, the presenter presents an object, such as one of the cards, to a sensor of the presentation control system, which causes the presentation system to retrieve and display the slide corresponding to the selected card to, for example, an audience.

Specifically, presentation authoring software is used to create presentation elements of a presentation such as slides, of a slide show, charts, graphs, maps, animation, video segments, multimedia clips and the like. Identification information is then assigned to each presentation element of the presentation. With the assigned identification information, a mnemonic and the identification element are associated with each presentation element within the presentation. Each mnemonic is then transferred to, or physically associated with, a tangible, sensible identification-carrying device.

To present the presentation elements of the presentation, the user introduces one of the tangible, sensible identification-carrying devices into the sensible area of a sensor of the presentation control system of this invention. In response to sensing the tangible sensible identification-carrying device, the presentation control system controls a presentation system to display the presentation element associated by the identification information with the tangible, sensible identification-carrying device. In this manner, the presenter's attention can be redirected from the presentation system to an audience and to the tangible sensible identification-carrying devices. These tangible sensible identification-carrying devices replace the attention-consuming graphical user interface of the presentation system, as well as allow for immediate access to any presentation element specified by the identifier contained by the selected tangible sensible identification-carrying device.

Figure 1:
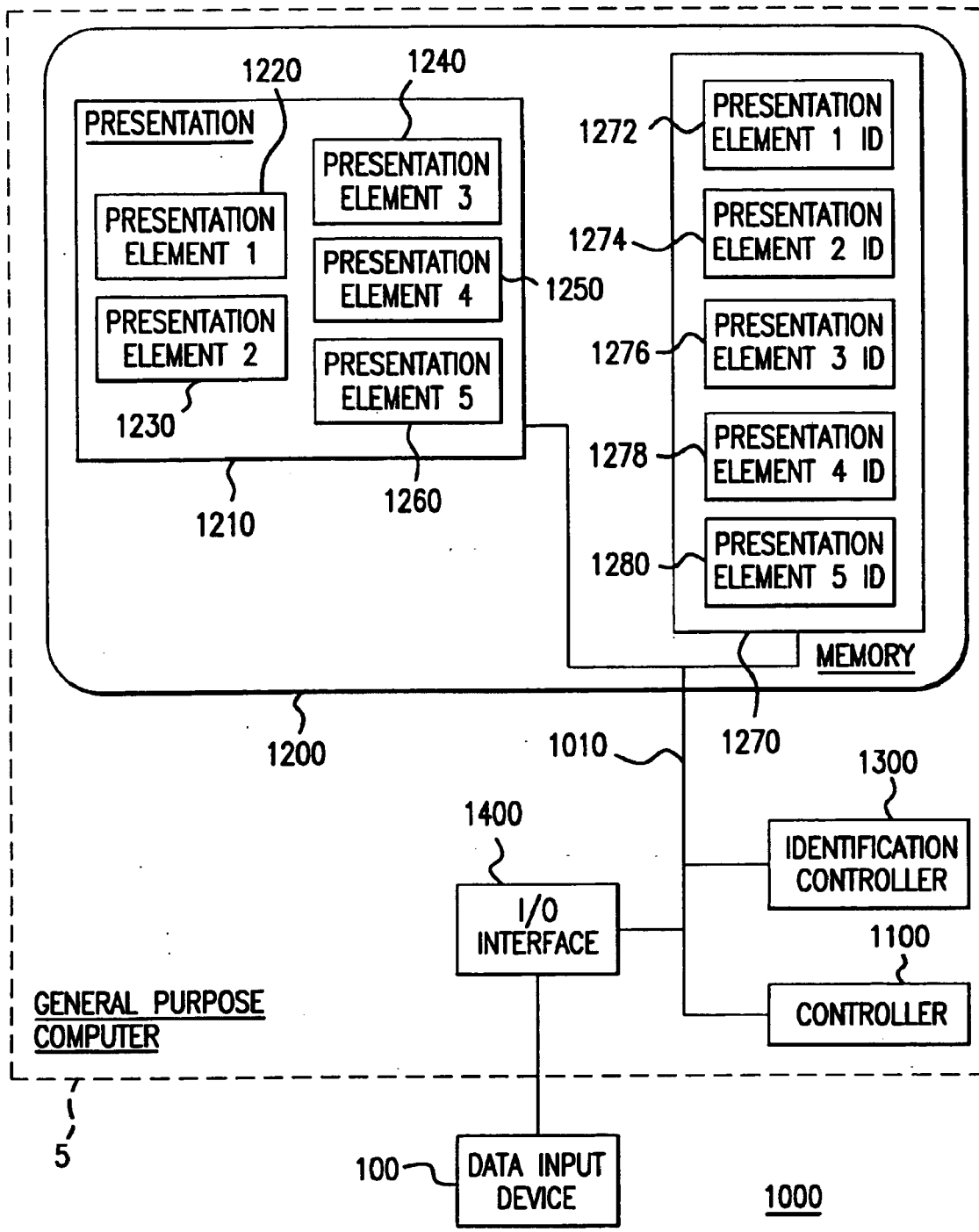
FIG. 1 is a functional block diagram showing a first embodiment of the presentation control system according to this invention.
Figure 2:
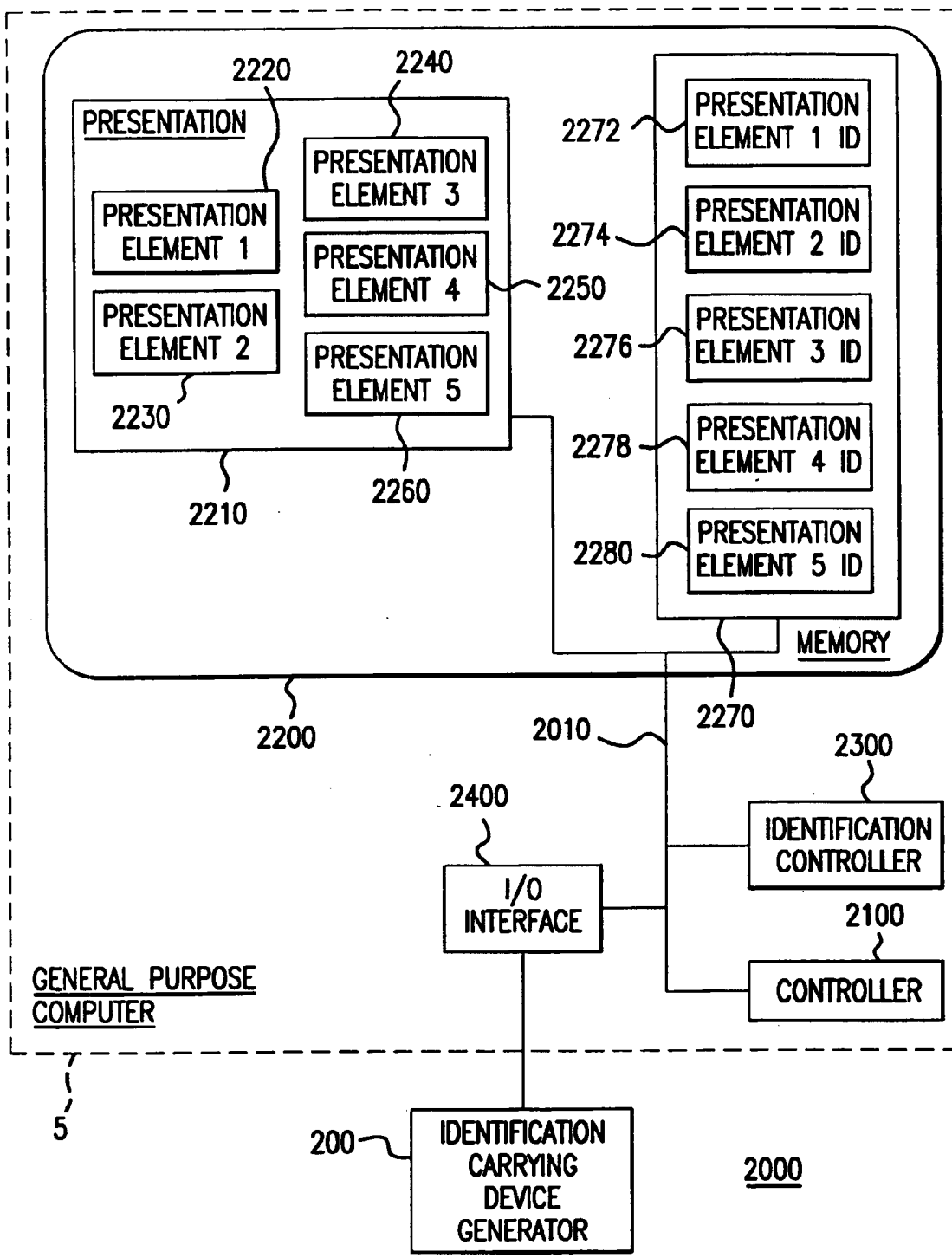
FIG. 2 is a functional block diagram showing a second aspect of the presentation control system according to this invention.
Figure 3:
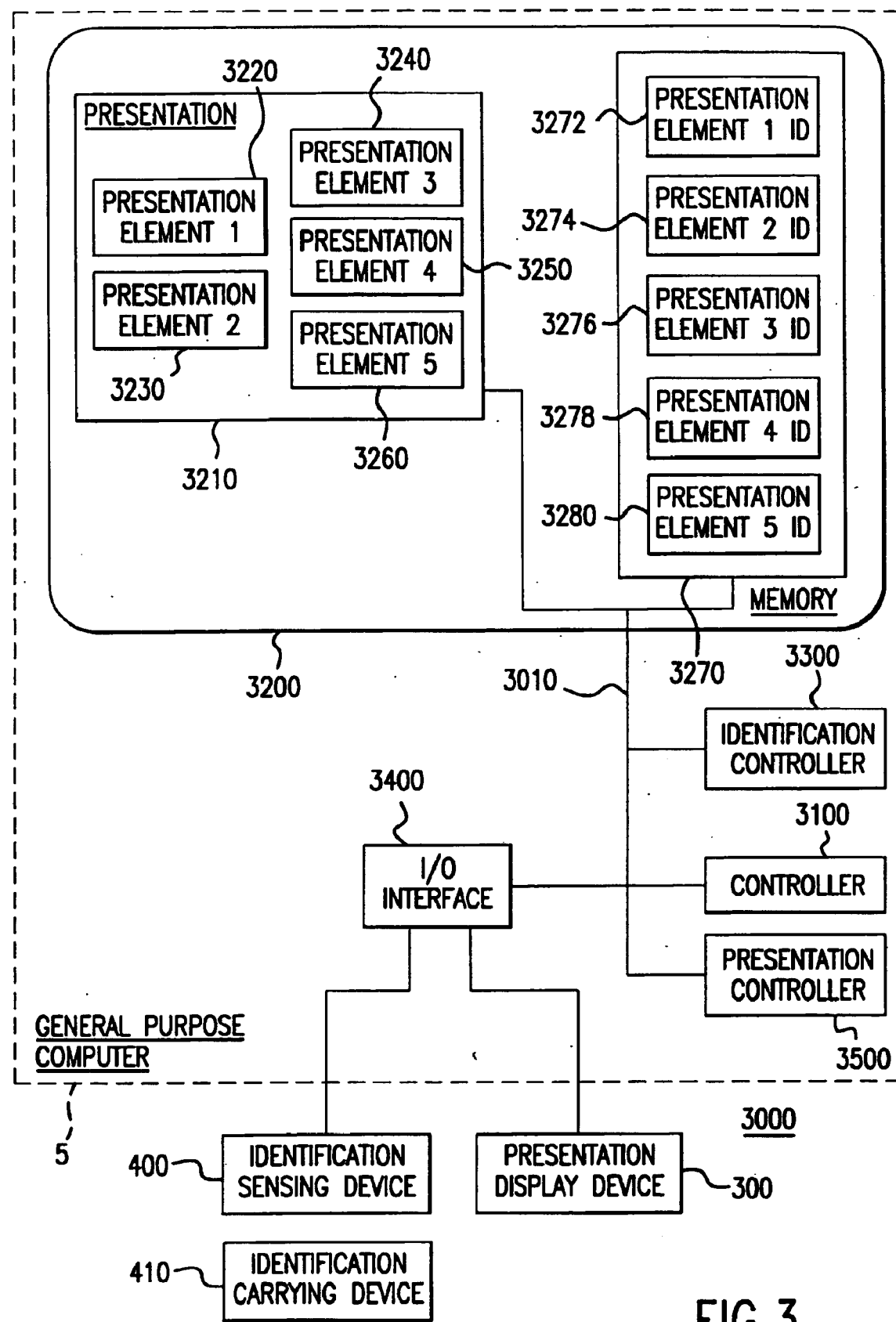
FIG. 3 is a functional block diagram showing a third aspect of the presentation control system according to this invention.

FIGS. 1–3 illustrate one embodiment of a presentation control system according to this invention. Specifically, FIGS. 1–3 illustrate how the components of the presentation control system 1000 change as a user creates a presentation in FIG. 1, as the user associates the tangible sensible identification elements with the presentation in FIG. 2, and as the user uses the presentation control system to control a presentation system in FIG. 3.

FIG. 1 illustrates the components of the presentation control system 1000 when creating a presentation. Specifically, the presentation system 1000 comprises a memory 1200, an identification controller 1300, an I/O interface 1400, a data input device 100, a link 1010 and a controller 1100. As shown in FIG. 1, the presentation control system is preferably implemented on a general purpose computers. The memory 1200 includes a presentation memory portion 1210 and a presentation element identifier memory portion 1270.

The stored presentation 1210 and the presentation element identification memory portion 1270 respectively include, for an exemplary presentation, a first presentation element 1220 and a first associated presentation element identifier 1272, a second presentation element 1230 and a second associated presentation element identifier 1274, a third presentation element 1240 and a third associated presentation element identifier 1276, a fourth presentation element 1250 and a fourth associated presentation element identifier 1278 and a fifth presentation element 1260 and a fifth associated presentation element identifier 1280. It should be appreciated that in actual use, there will be as many presentation elements in the presentation 1210 and as many associated presentation element identifiers in the presentation element identification memory 1270 as needed by the user.

The user inputs data through the data input device 100. The data corresponds to information that the user would like incorporated into, for example, a presentation. The data is transferred from the data input device 100 to the I/O interface 1400. The input data can be any material a user deems helpful for creating a presentation. Specifically, the data can include, but is not limited to, graphics, charts, multimedia clips, text strings, animated graphics, sprites, or any other electronically readable presentation aid. The input data, under control of the controller 1100, is stored in one of the presentation elements in the presentation memory 1210. The collective presentation 1210 is stored as the individual elements within the presentation, as for example, the first-fifth presentation elements 1220–1260. The identification controller 1300, via the link 1010, maps a presentation element identifier to each of the presentation elements 1220–1260. Therefore, each of the first-fifth presentation element identifiers 1272–1280 is respectively associated with at least one of the first-fifth presentation elements 1220–1260.

Once the presentation 1210, the presentation elements 1220–1260 and the associated presentation element identifiers 1272–1280 have been created and stored, the user then uses the presentation control system 1000 to associate the presentation elements 1220–1260 with tangible, sensible identification-carrying devices.

FIG. 2 illustrates one embodiment of the components of a presentation control system 2000 used to prepare the tangible, sensible identification-carrying devices. The presentation control system 2000 comprises a controller 2100, a memory 2200, an identification controller 2300, an I/O interface 2400 and a tangible sensible identification-carrying device generator 200. The memory 2200 includes the presentation 2210, the first-fifth presentation elements 2200–2260 and first-fifth presentation element identifiers 2272–2280.

The user selects mnemonics that will represent to that user the various presentation elements associated with the tangible sensible identification-carrying devices. The mnemonics can be determined or generated in various ways. Specifically, the mnemonics may be a product of the presentation control system 2000. In this case, the presentation control system 2000 using the presentation elements 2220–2260 will generate thumbnail images corresponding to the individual presentation elements. Each of these thumbnail images will then be associated with the corresponding presentation element identifier as a mnemonic for the corresponding presentation element and forwarded to the identification-carrying device generator 200. Once each mnemonic is linked to the corresponding presentation element identifier, the presentation control system 2000 forwards the mnemonic and the presentation element identifier to the identification-carrying device generator 200. The identification-carrying device generator causes the mnemonic and the associated presentation element identifier to be associated together with a tangible sensible identification-carrying device.

Alternatively, a mnemonic for a particular presentation element can be chosen by the user. In this scenario, the user picks a representation, such as a graphic or clipart image, that represents to that user at least one presentation element. Once the mnemonic has been chosen by the user and entered into the presentation control system 2000, the presentation control system 2000 associates the user-chosen mnemonic representing the particular presentation element or elements with the corresponding presentation element identifier. As discussed previously, the presentation control system 2000 then forwards the mnemonic and the presentation element identifier to the identification-carrying device generator 200. Once the mnemonic and the presentation element identifier are received by the identification-carrying device generator 200, the identification carrying device generator 200 associates the mnemonic and the presentation element identifier together with a tangible sensible identification-carrying device.

Alternatively, the determination of a mnemonic to be associated with one or a) more particular presentation elements-could be an amalgamation of user input data and presentation control system-selected data. For example, while the presentation control system 2000 could produce a thumbnail image representative of a particular presentation element, the user could then append text to be associated with the thumbnail image. In this exemplary instance, both the thumbnail image and the user, created text are combined to form the mnemonic.

Furthermore, the mnemonics can be supplemented by, for example, handwritten speech notes added by the user via a pen, pencil, stamp, or the like, made directly on, or attached to, the identification-carrying device such as a document stapled to the identification-carrying device. Supplemental notes can be derived from information contained within the presentation element. Alternatively, the supplemental notes may be anything a presenter finds useful. Thus, the identification-carrying device not only serves as a physical object that represents the presentation content, but doubles as an object that can contain private notes that supplement the presenter's comments, remarks, or other notations. Therefore, the presenter can easily make annotations 'on the fly' to the identification-carrying device to further aid with a presentation or to record comments made, for example, during the presentation.

FIG. 3 illustrates one embodiment of the components of a presentation control system 3000 used during a presentation. The presentation control system 3000 includes an identification sensing device 400, a presentation display device 300, the controller 3100, the memory 3200, the identification controller 3300, the I/O interface 3400, the presentation controller 3500, the presentation elements 3220–3260 and the presentation element identifiers 3272–3280 stored in the memory 3200, and one or more tangible sensible identification-carrying devices 410.

Once the tangible sensible identification-carrying device(s) 410 have been produced by the presentation control system 2000, a user can use the identification-carrying device(s) 410 during a presentation. The particular tangible sensible identification-carrying device 410 for a desired presentation element is identified by the user based on the mnemonic for that presentation element that is attached to, or otherwise associated with, one of the tangible sensible identification-carrying devices 410. That tangible sensible identification-carrying device 410 is placed, at least momentarily, in the sensible area of the identification sensing device 400. The identification sensing device 400 outputs, via the I/O interface 3400 and the link 3010, the presentation element identifier information associated with that particular tangible sensible identification-carrying device 410. The identification controller 3300 associates the presentation element identifier information received from the identification-carrying device 410 with a particular presentation element based on the presentation element identifiers stored in the presentation element identification memory 3270. The identification controller 3300 then outputs a signal to the presentation controller 3500 indicating the selected presentation element. The presentation controller 3500 retrieves, via the link 3010, a particular presentation element indicated by the received signal. A signal representing-the selected presentation element is then output via the link 3010 and the I/O interface 3400 to the presentation display device 300 and displayed.

As noted in relation to previous embodiments, the tangible sensible identification-carrying device can be any device capable of carrying a mnemonic relating to the presentation element associated with the presentation element identifier contained in the tangible sensible identification-carrying device 430.

One particular exemplary embodiment of the tangible sensible identification-carrying device 410 is a card containing a thumbnail image forming the mnemonic where the thumbnail image represents a particular presentation element, and at least one barcode forming the presentation element identifier. While the presentation control system 3000 of this invention is by no means limited to this particular exemplary embodiment, this example is chosen for its simplicity. This exemplary embodiment uses a barcode scanner as the identification sensing device 400 and a printer as the identification-carrying device generator 200. The printer, at the direction of the user and/or the presentation control system, produces a printed card or page i.e., the tangible sensible identification-carrying device. The tangible sensible identification-carrying device 410 contains a barcode as the presentation element identifier, printed on the card or page. A thumbnail image representing at least one particular presentation element as the mnemonic, is also printed on the card. FIGS. 4–18 illustrate exemplary printed cards that the inventors have developed as the identification-carrying devices 410.

Figure 4:
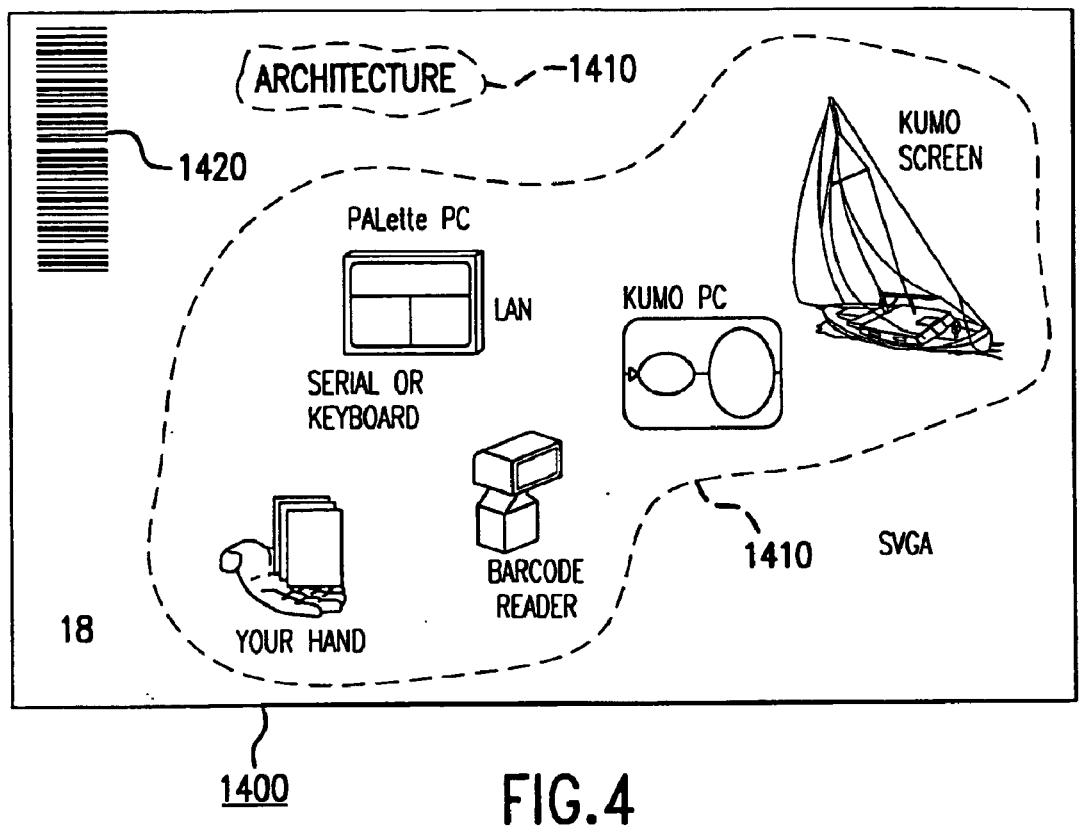
FIG. 4 shows a first exemplary identification-carrying device.
Figure 5:
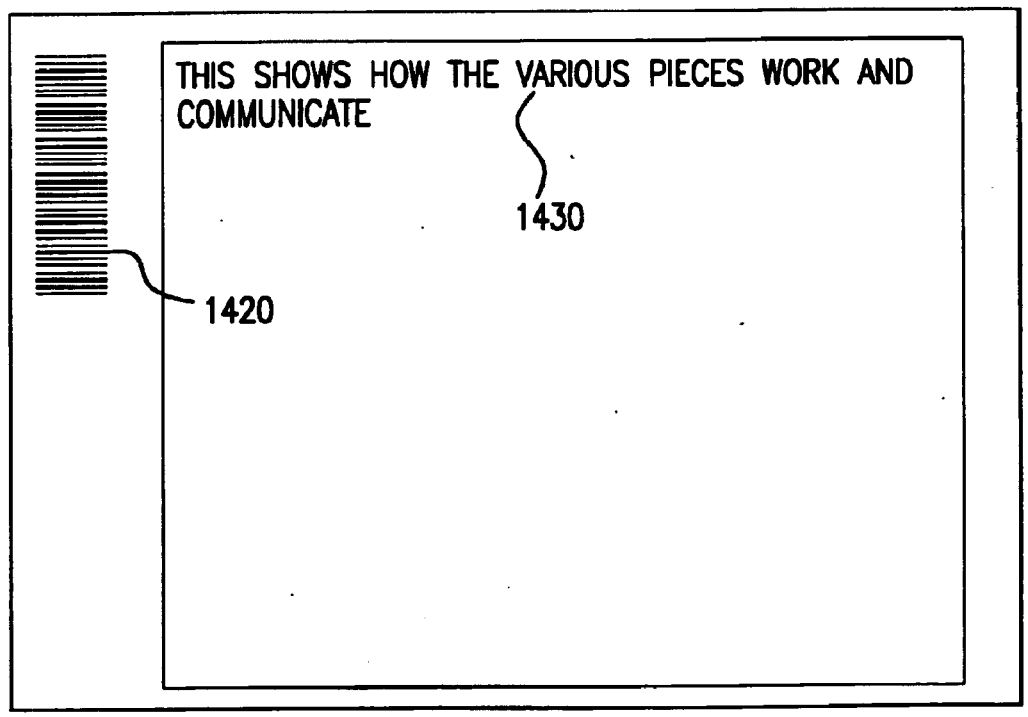
FIG. 5 shows an exemplary back side of the first identification-carrying device shown in FIG. 4.

Specifically, FIGS. 4–12 illustrate how an exemplary identification device 410 may appear. FIG. 4 represents the front side of an identification-carrying card 1400 containing a mnemonic 1410 and a barcode 1420 forming representing the presentation element identifier. FIG. 5 illustrates the back side of the card shown in FIG. 4. The back side of the card also contains a mnemonic 1430, which is a text string, and another copy of the barcode 1420.

As shown in FIGS. 4 and 5, the barcode 1420, as presentation element identifier, is associated with one or more mnemonics 1410 or 1430, which are in turn linked to a particular presentation element. However, it should be appreciated that the presentation element identifier need not be linked to a particular presentation element within one particular presentation. To the contrary, the presentation element identifier identifies any presentation element or set of presentation elements in any presentation. For example, the presentation element identifier can be, for example, a hyperlink, a filename, a page number, a uniform resource locator (URL), a full text search keyword or other query syntax, a database address and/or a path to a particular memory location inside or outside of the presentation control system which contains at least one specific presentation element. It should be understood that the presentation element identifier is in no way limited to identifying a particular presentation element in one particular loaded presentation, but can also be a path to at least one memory location containing at least one presentation element for subsequent display. The only requirement of the presentation element identifier is that it contain sufficient information that the presentation control system can, possibly along with static information, identify the desired presentation element. Such static information can be, for example, the current presentation of the current presentation element being displayed.

FIGS. 6–12 illustrate other various exemplary embodiments of the configuration of the presentation element identifier and mnemonics on an exemplary printed card or paper. These various configurations are shown to illustrate some of the particular designs of the card.

Figure 6:
FIG. 6 illustrates a second exemplary identification-carrying device.
Figure 6:
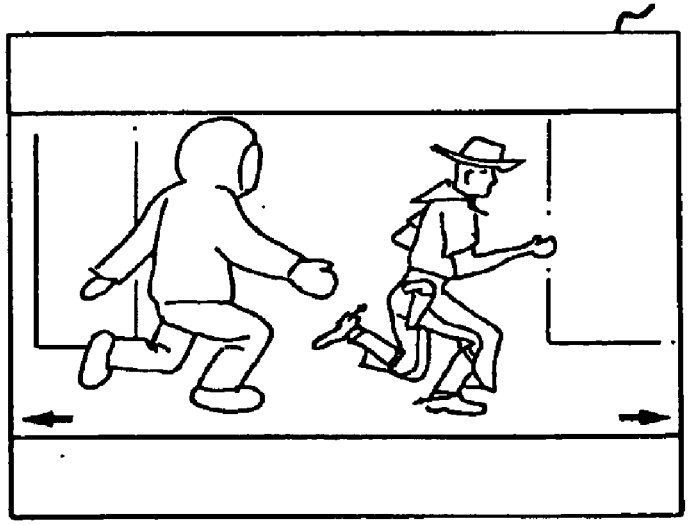
Figures 7, 8:
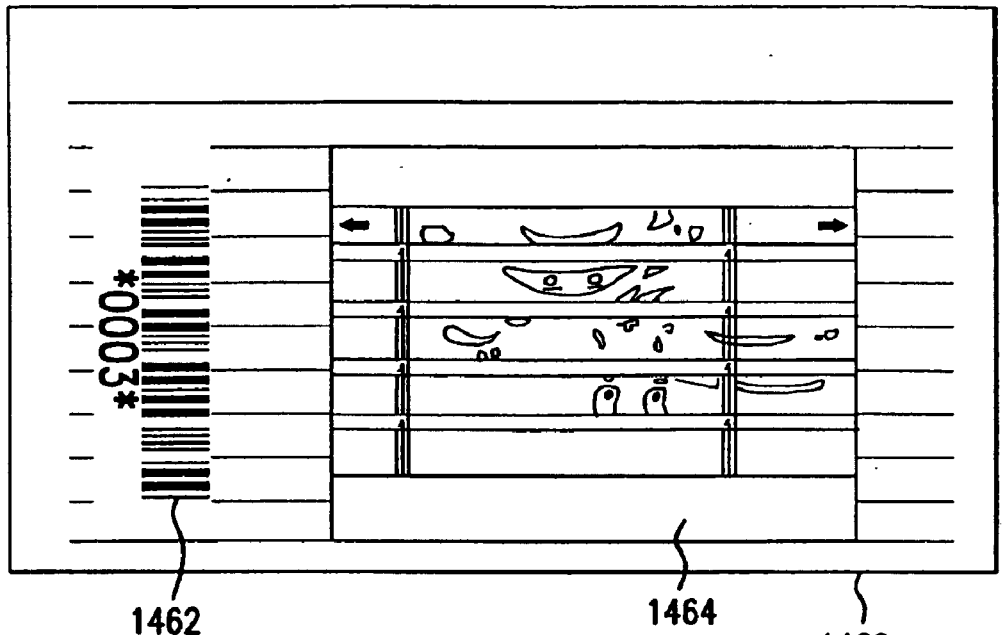
FIG. 7 illustrates a third exemplary identification-carrying device.
FIG. 8 illustrates an exemplary back side of the third identification-carrying device shown in FIG. 7.
Figure 9:
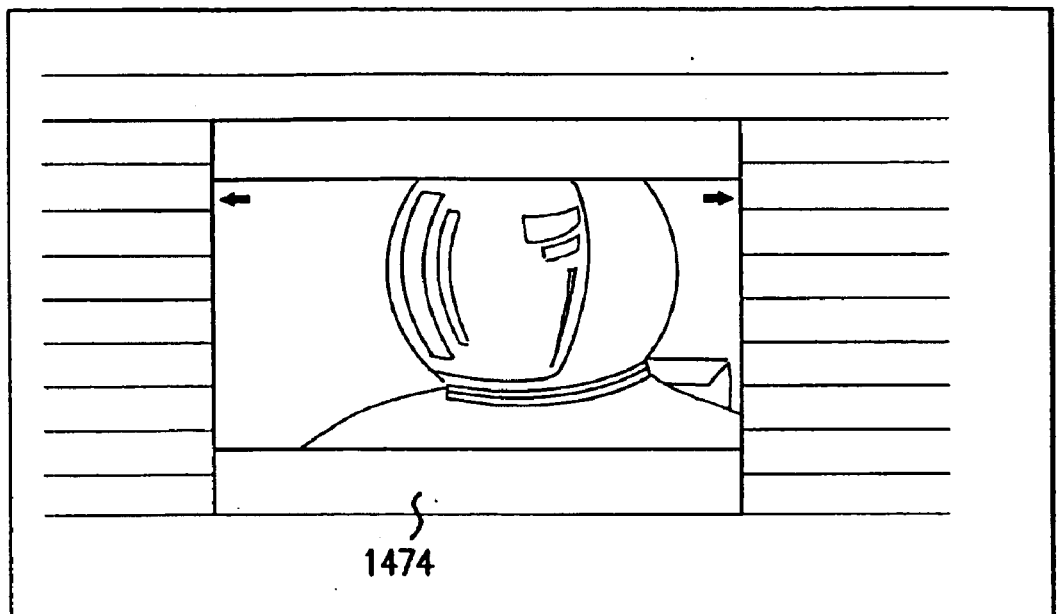
FIG. 9 illustrates a fourth exemplary identification-carrying device.
Figure 10:
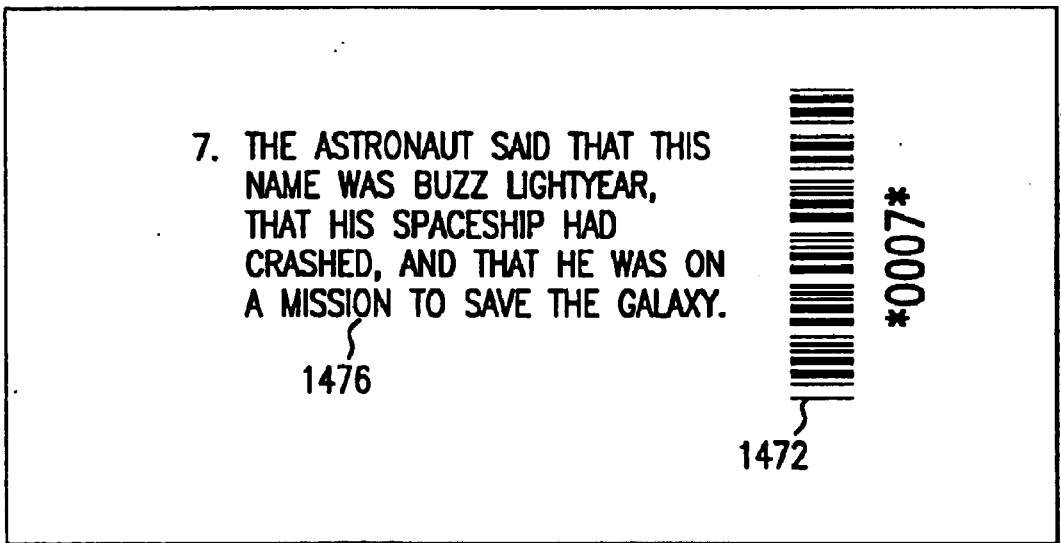
FIG. 10 illustrates an exemplary back side of the fourth identification-carrying device shown in FIG. 9.
Figure 11:
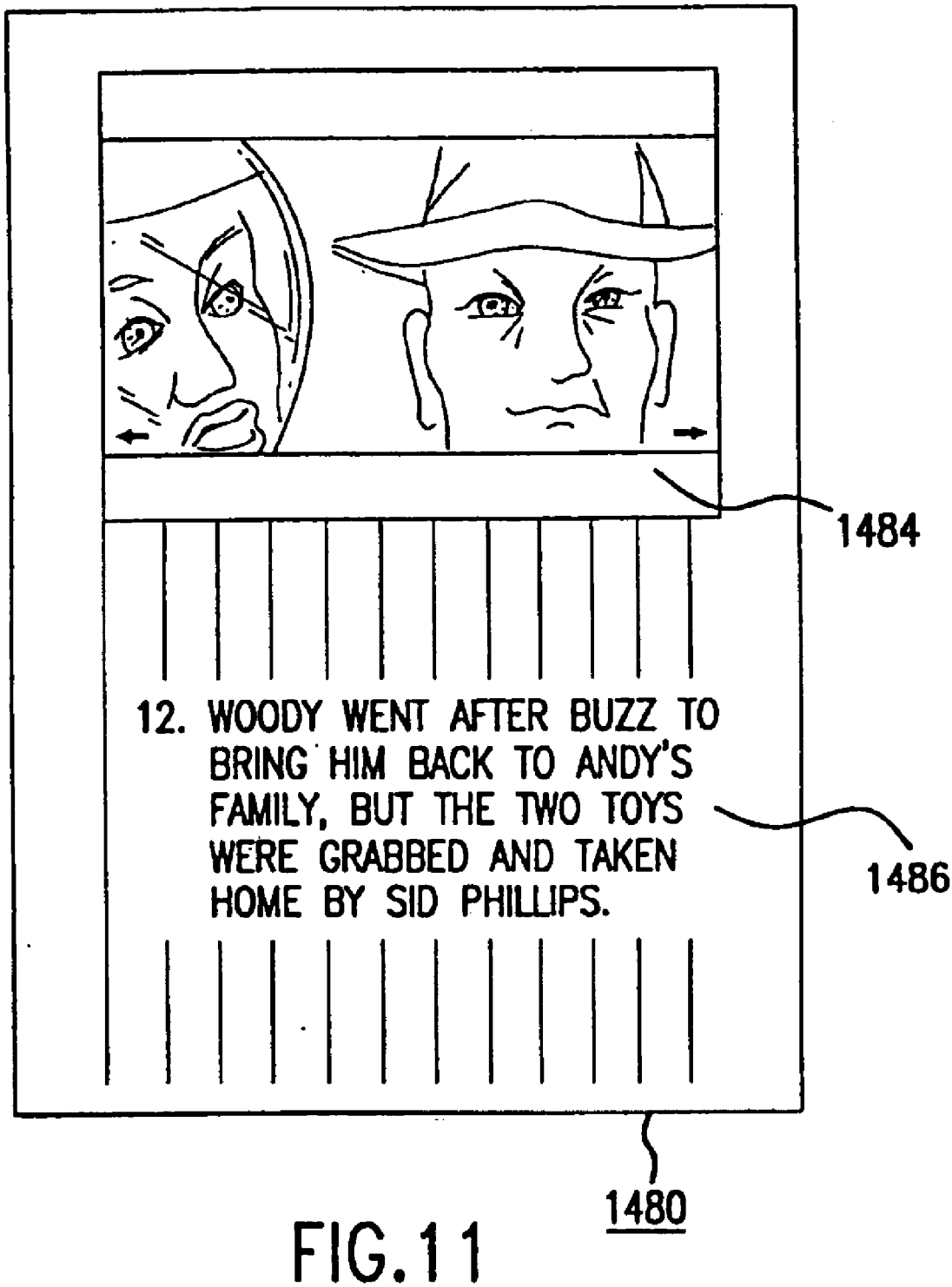
FIG. 11 illustrates a fifth exemplary identification-carrying device.
Figure 12:
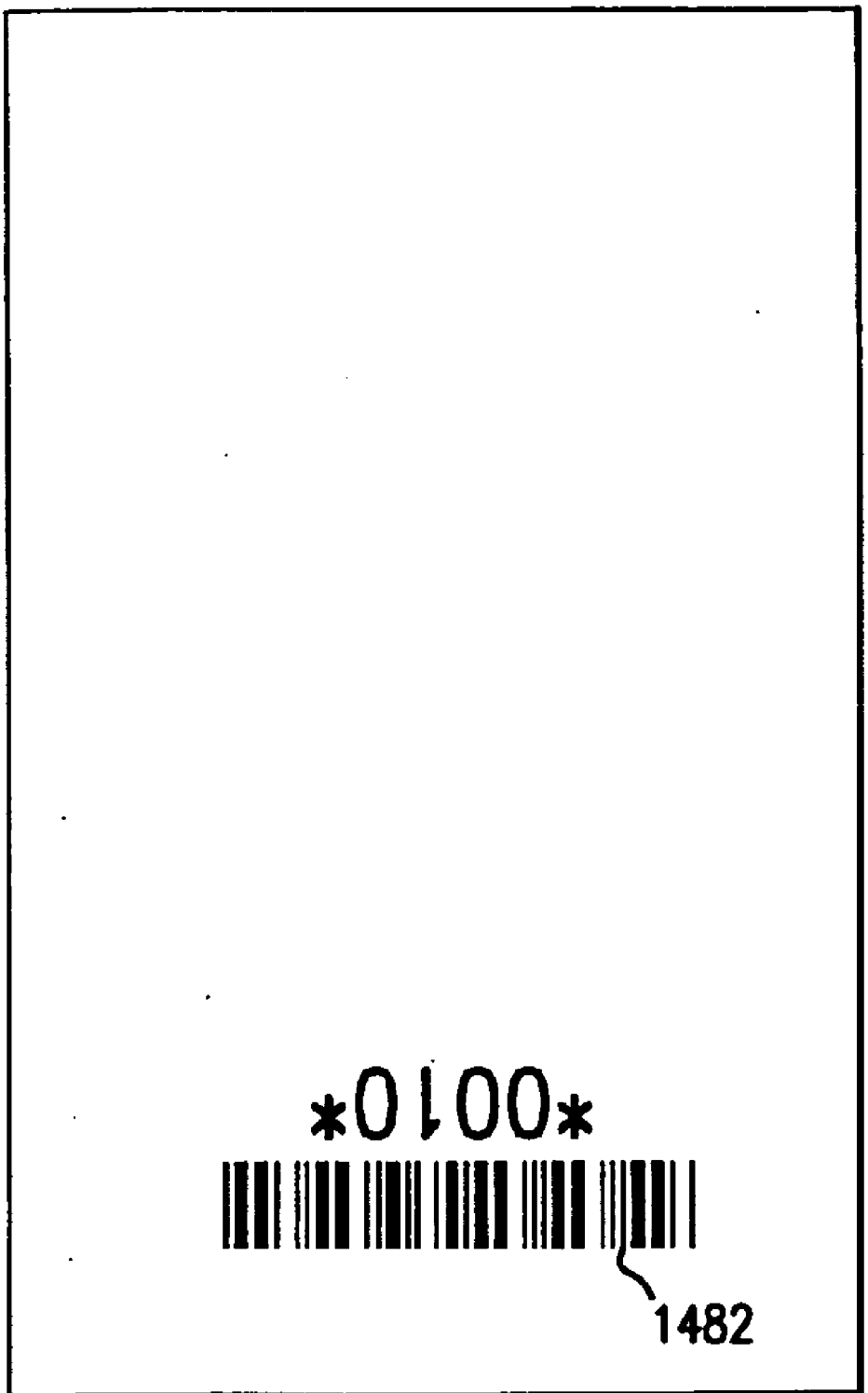
FIG. 12 illustrates an exemplary back side to the fifth identification-carrying device shown in FIG. 11.

For example, in FIG. 6, the barcode 1452, as the presentation element identifier, the thumbnail image 1454 and the text 1456, as the mnemonic, are seen in a vertical orientation on the same face of a card 1450. FIG. 7 illustrates a particular design where barcode 1462, as the presentation element identifier and thumbnail image 1464, as the mnemonic are shown on the front of a card 1460. Another text string 1466, which is additional information that may act as a second mnemonic, is shown on the back of the card in FIG. 8. FIGS. 9 and 10 show the design of a front and back of a card 1470 respectively. In FIG. 9, the front of the card 1470 contains a thumbnail image 1474 as a first mnemonic. The back of the card 1470, shown in FIG. 10, contains a text string 1476 as a second mnemonic and barcode 1472 as the presentation element identifier. FIGS. 11 and 12 show another design of a card 1480 where a thumbnail image 1484 and a text string 1486, as the mnemonic, are contained on one side of the card 1480 and a barcode 1482, as the presentation element identifier is placed on the back side of the card 1480.

Figure 13:
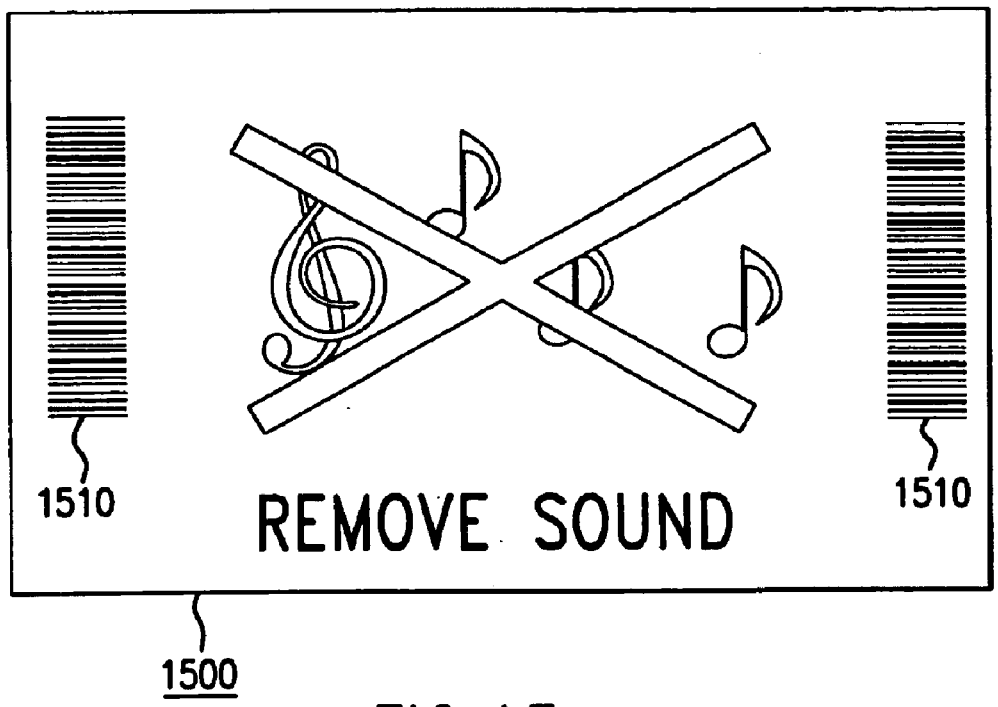
FIGS. 13–18 illustrate a number of exemplary functional identification-carrying devices.

FIG. 13 illustrates an exemplary functional tangible sensible identification-carrying device 1500. Specifically, the functional tangible sensible identification device 1500 contains a functional presentation or control element identifier 1510. Instead of being linked to a particular presentation element, the control element identifier 1510 identifies a control element to the presentation control system. In FIG. 13, the control element identifier 1510 identifies a function that turns off the sound. In response to sensing the control element identifier 1510, the presentation control system instructs the presentation system to turn off the sound. FIGS. 14–18 illustrate other exemplary control element identification cards which the user may generate to facilitate the presentation process.

Figure 14:
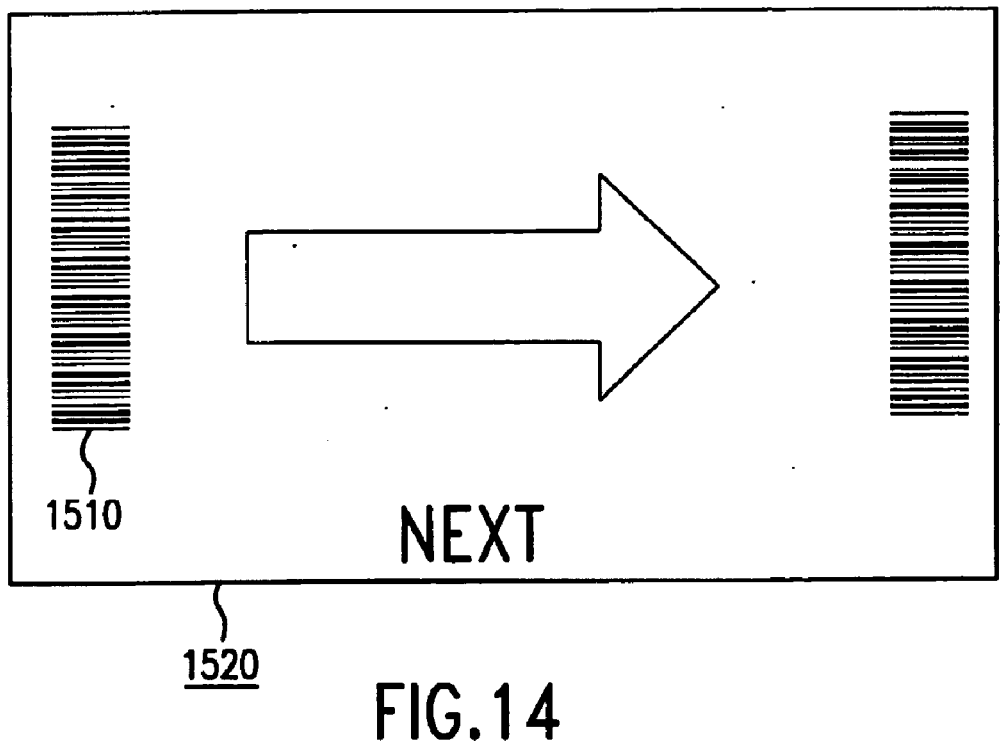
Figure 15:
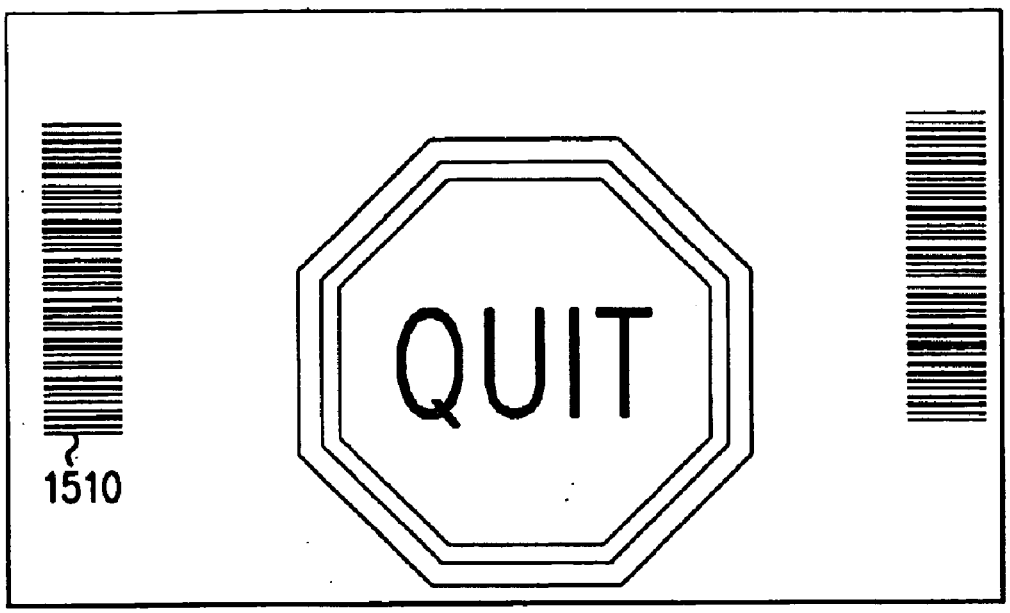
Figure 16:
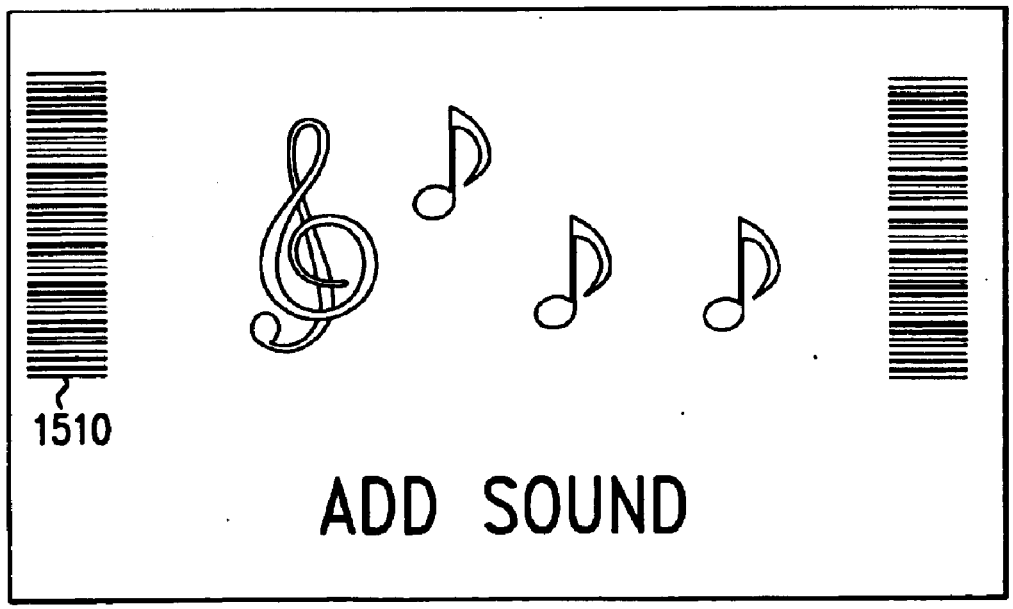
Figure 17:
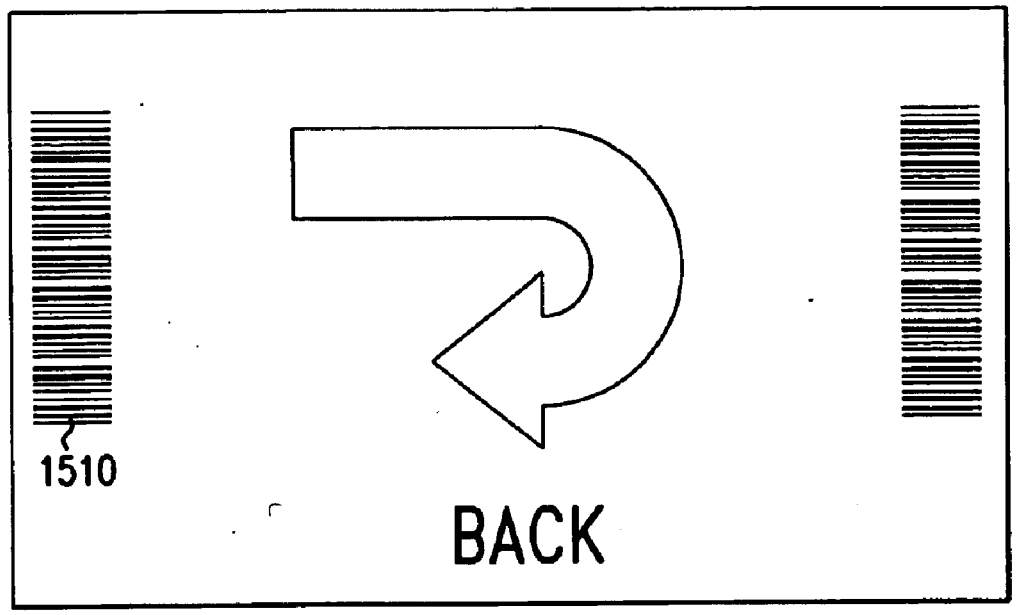
Figure 18:
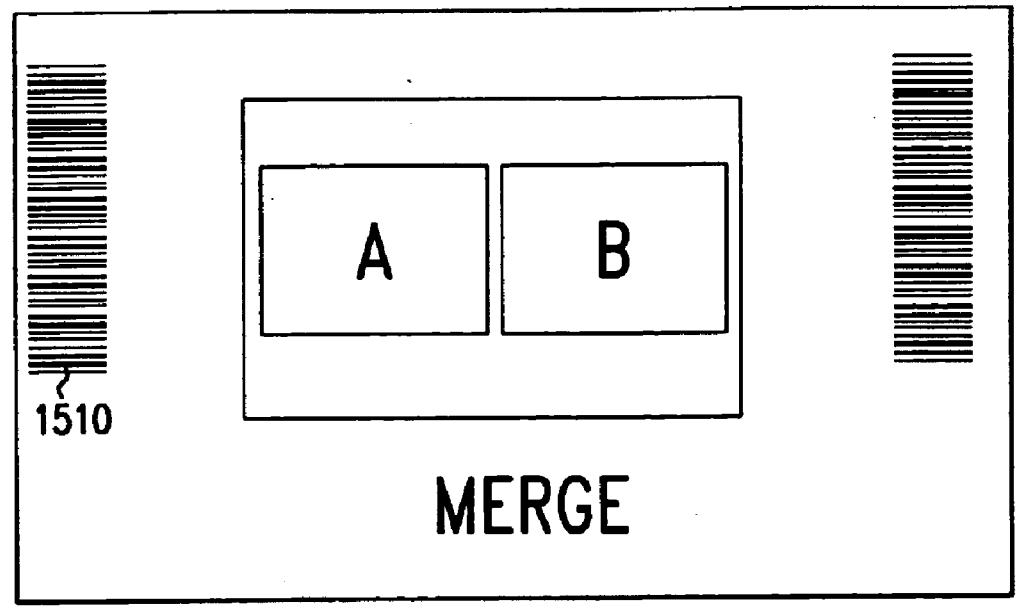

For example, a user has prepared a set of cards as tangible sensible identification-carrying devices to supplement a presentation. These cards correspond to presentation elements, for example slides, which are to be displayed to the audience during the course of the presentation. To commence a presentation, the user places the card corresponding to the first desired presentation element in the sensible area of the identification sensing device 400. The identification sensing device 400 reads the presentation element identifier contained on the card and the presentation control system subsequently instructs the presentation system to retrieve the associated presentation element and display that presentation element to the audience on the presentation display device. The user could then place a 'function card', such as the "next card," functional tangible sensible identification card 1520, as illustrated in FIG. 14, in the sensible space of the identification sensing device 400 to advance the presentation to a next identified presentation element.

Alternatively, a user could be questioned regarding a particular aspect of the presentation. In order to investigate this particular matter more closely, the user could introduce a card into the identification sensing device 400 that identifies a presentation element from a completely unrelated presentation. This presentation element, would, if available to the presentation control system, be displayed to the audience. Accordingly, the presentation control system is limited as to what it can display or do only by the availability or connectability to additional presentation elements or functions.

In FIGS. 13–18, exemplary function cards are shown with a plurality of presentation element identifiers. Specifically, the "Quit" function card shown in FIG. 15 could cause the presentation control system to provide an instruction to the presentation control to remove any displayed presentation slides from the screen. The "Add Sound" function card shown in FIG. 16 could cause the presentation control system to instruct the presentation controller to turn on a sound or sound clip identified by the currently-selected or displayed presentation element identifier. The "Back" function card in FIG. 17 could cause the presentation control system to provide an instruction to the presentation control to re-display the previous slide. The "Merge" function card in FIG. 18 could cause the presentation control system to provide an instruction to the presentation control to merge multiple slides into one composite slide.

In FIGS. 13–18, multiple presentation element identifiers are printed on the exemplary cards to facilitate reading by the identification sensing device. It should be appreciated that the presentation element identifiers can be located anywhere, and more than one mnemonic and associated presentation element identifier can be located on a single tangible sensible identification-carrying device. Finally, the presentation element identifier does not need to be in the form of a bar code. Thus, the front of one card forming a tangible, sensible identification device could have one presentation element identifier and one mnemonic, while the back side could have a different presentation element identifier and associated mnemonic. Similarly, each end of one side of the card could have different presentation element identifiers and mnemonics. As previously discussed, these presentation element identifiers could even be a data glyph or could be electronic data stored on a computer readable microchip embedded into a figurine or other tangible object.

Furthermore, it should be understood that the identification-carrying device 410 need not be limited to carrying information pertaining to one particular presentation element, but can also be expanded to carrying not only the presentation element identifier, but also mapping data for the presentation of which the presentation element is an element. Thus, if a function card is introduced after an identification-carrying device has been sensed that does not correspond to the currently loaded presentation, the function card can, for example, navigate within the newly loaded presentation.

Alternatively, mapping data for one or more separate presentations can be encoded on a particular identification-carrying device. Therefore, complete intra or inter-navigation between the one or more presentations can be accomplished by using an identification-carrying device, and/or also by using a function carrying device. While tangible sensible identification-carrying devices have been explained in relation to a particular presentation element identifier which is associated with a particular presentation element, the presentation element identifier need not be limited to a static presentation element. Alternatively, the tangible sensible identification-carrying device 410 can contain a presentation element identifier which identifies a function to be performed by the presentation system and/or applied to a particular presentation element.

As with a presentation element identifier that identifies a presentation clement and which is used by the presentation control system to identify the presentation element to be displayed, a presentation element identifier can also be used to identify a particular function used to instruct the presentation control system to perform and/or apply to a particular presentation element. In this case, instead of a presentation element being identified, a function, such as navigation through a presentation or turning a particular aspect of the presentation system on or off, can be accomplished.

The tangible sensible identification-carrying device need not be limited to only carrying a presentation element identifier having an associated presentation element. In particular, the tangible sensible control identification-carrying device can identify control functions associated with objects within a presentation element.

For example, if a presentation element, for example a slide, contains an object, for example an audio, video or multimedia clip, the control identification sensing device, in cooperation with a control identification-carrying device can control, i.e., play, stop, fast forward, or the like, the element contained within the presentation element.

Figure 19:
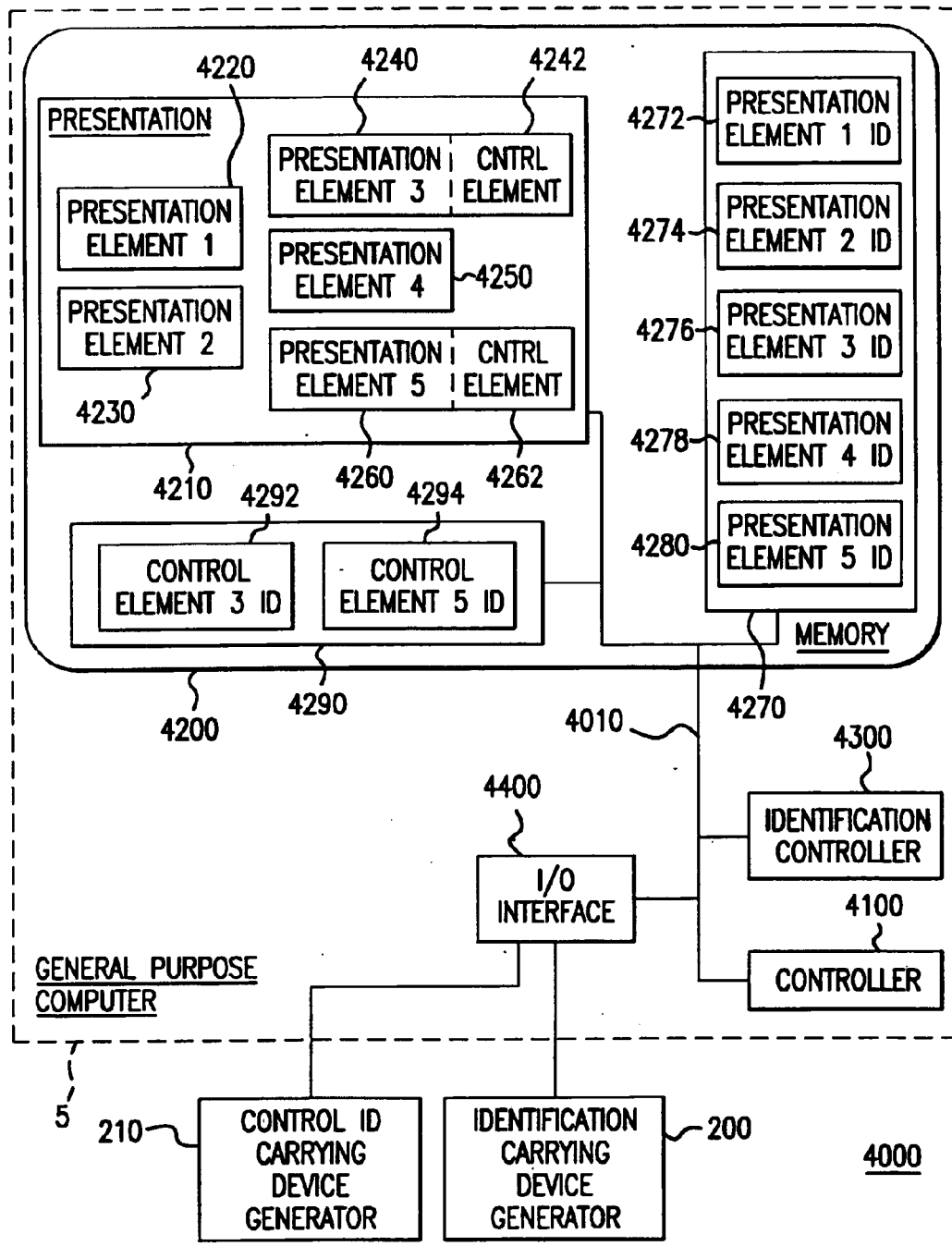
FIG. 19 is a functional block diagram showing a fourth aspect of the presentation control system according to this invention.

FIG. 19 illustrates one embodiment of the components of a presentation control system 4000 used to prepare a control identification-carrying device. The presentation control system 4000 comprises the controller 4100, the memory 4200, the identification controller 4300, the I/O interface 4400, the tangible sensible identification-carrying device generator 200 and the control identification-carrying device generator 210. The memory 4200 includes in the presentation element portion 4210 of the memory, the first-fifth presentation elements 4220–4260, and the controllable elements 4242–4262. The presentation element identifier portion 4270 of the memory 4200 comprises the first-fifth presentation element identifiers 4272–4280. Additionally, the memory 4200 includes a control identification storage portion 4290 and control element identification's 4292–4294.

Controllable objects 4242 and 4262 are "active" portions within a presentation element. As with the relationship between the presentation elements and the presentation element identifiers, a similar relationship exists between the control elements 4242 and 4262 and the control element identifiers 4292 and 4294, respectively.

As with the embodiment illustrated in FIG. 2, the user selects mnemonics that will represent to that user the various presentation elements and/or the control elements associated with a particular tangible sensible identification-carrying device or control identification-carrying device, respectively. The mnemonics can be determined or generated in various ways. Specifically, the mnemonics may be a product of the presentation control system 4000. In this case, the presentation control system 4000, using the presentation elements 4220–4260 and associated control elements 4242 and 4262, will generate mnemonics, such as thumbnail images, corresponding to the individual presentation elements. In addition to the thumbnail images that may be used to represent the presentation elements, the presentation control system 4000 will also generate mnemonics representing the control functions for the control elements associated with a presentation element. Each of these mnemonics will then be associated with the corresponding presentation element identifier and the control element identifier, respective, as mnemonics for the corresponding presentation element and the control element, respectively, and forwarded to the identification-carrying device generator 200 and control identification-carrying device generator 210, respectively. Once each mnemonic is linked to the corresponding identifier, the presentation control system 4000 forwards the mnemonic and the identifiers to the appropriate identification-carrying device generators. The identification-carrying device generators cause the mnemonics and the associated presentation element identifier or control element identifier to be associated together with a tangible, sensible identification-carrying device.

Alternatively, a mnemonic for a particular control element can be chosen by the user. In this scenario, the user picks a representation, such as a graphic or a clip art image, that represents to that user at least one control element. Once the mnemonic has been chosen by the user and entered into the presentation control system 4000, the presentation control system 4000 associates the user-chosen mnemonic representing the particular control element or elements with a corresponding control element identifier. As discussed previously, the presentation control system 4000 then forwards the mnemonic and the control element identifier to the control identification-carrying device generator 210. Once the mnemonic and the control element identifier are received by the control identification-carrying device generator 210, the control identification-carrying device generator 210 associates the mnemonic and the control element identifier together with a tangible sensible identification-carrying device.

Alternatively, the determination of a mnemonic to be associated with one or more particular control elements could be an amalgamation of user input data and presentation control system selected data. For example, while the presentation control system 4000 can produce a thumbnail image representative of a particular control element, the user could then append text to be associated with the thumbnail image. In this exemplary embodiment, both the thumbnail image and the user-created text are combined to form the mnemonic.

Furthermore, it should be appreciated that the control identification-carrying device generator 210 and the identification carrying device generator 200 can associate the respective control element identifiers and presentation element identifiers with the same tangible sensible identification-carrying device, or separate, tangible sensible identification-carrying devices. Accordingly, the control identification-carrying device generator 210 and the identification-carrying device generator 200 can be incorporated into one hardware component.

The memory 4200 comprises a control identification portion 4290. The control identification portion 4290 comprises the control identifications 4292–4294 that correspond to active objects within a presentation element. As illustrated in FIG. 19, the presentation element 4240 has a corresponding control element identification 4292 and similarly, the presentation element 4260 has a corresponding control element identification 4294. These control identifications correspond to control functions associated with active objects within a presentation element. For example, a presentation element may have an active element such as an audio or multimedia clip. As a user generates identification-carrying devices with the identification-carrying device generator 200 and/or controllable element identification-carrying devices with the control identification device generator 210, the presentation control system 4000 monitors the presentation elements requested for the presentation. If the presentation control system 4000 determines that there is an active element within a presentation element, the presentation control system 4000 queries the user as to whether the user would like to associate a control function with that active element.

For example, if the controllable element 4242 within presentation element 4240 is a multimedia clip, the presentation control system would present to the user a set of typical control functions associated with that particular controllable element. The presentation control system 4000, upon receiving a request by the user to associate a control function with that particular controllable element, generates a control identification that both corresponds to the controllable element as well as to the control function, i.e., play, stop, fast forward, rewind, or the like, associated with that controllable element. In the illustrative embodiment shown in FIG. 19, the presentation element 4240 has an associated controllable element 4242. The associated controllable element 4242 has a corresponding control element identification 4292 stored in the memory 4290.

It should also be appreciated that a presentation element can contain more than one controllable element. If this is the case, the presentation control system steps through each controllable element within a presentation element and queries the user whether a control is to be associated with that controllable element, and if so, a further query as to the specific control. Furthermore, it should be appreciated that more than one control can be associated with any particular controllable element. For example, the controllable element carrying device generated by the controllable element device generator can have a plurality of switches. Each of these switches can be associated with a different control element identification.

For example, in use, as a user assembles various presentation elements for display during a presentation, the presentation control system 4000 monitors the presentation elements added to the presentation. If the presentation control system 4000 determines that a presentation element contains one or more controllable elements, the presentation control system 4000 detects the type of controllable element. Based on this detection, the presentation control system 4000 queries the user as to what type of control the user desires to associate with that particular controllable element. For example, if a presentation element, such as a slide, contains a controllable element, such as a multimedia clip, the presentation control system 4000 will generate and present to the user a set of a predetermined controls typically associated with multimedia clips. For example, the controls can be play, stop, fast forward, rewind, increase volume, decrease volume, or the like. However, it should be fully appreciated that users may also enter specialized controls, or combinations of specialized controls and predetermined controls. For example, if the controllable element is a video clip, and the presentation control system 4000 presents to the user the controls play, stop, fast forward and rewind, the user may also want to add "cue" to the list of controls. Therefore, the controls associated with a particular controllable element within a presentation element could also be a combination of presentation control system, chosen controls and user controls.

Figure 20:
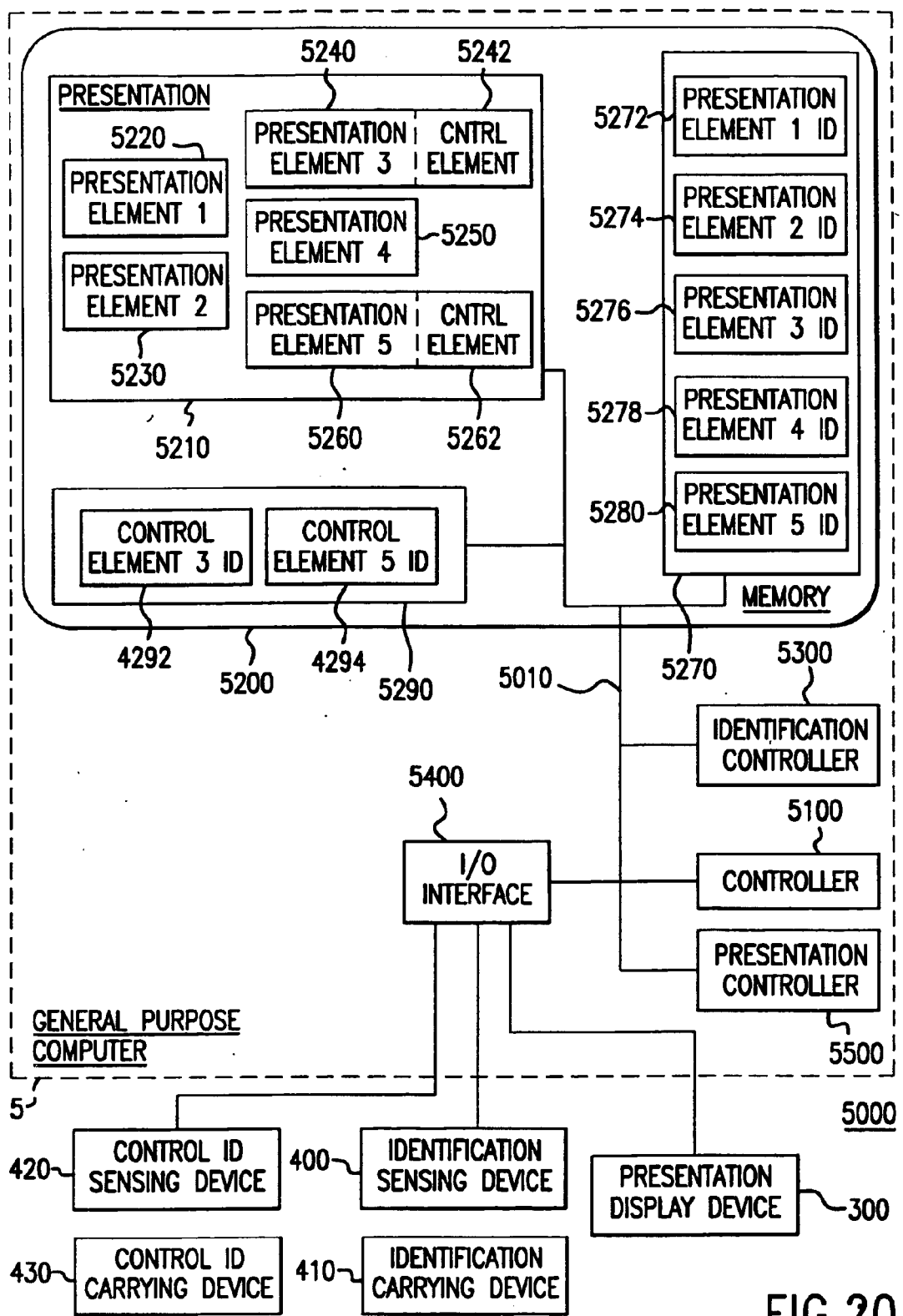
FIG. 20 is a functional block diagram showing a fifth aspect of the presentation control system according to this invention.

FIG. 20 illustrates one embodiment of the components of a presentation control system 5000 used during a presentation. The presentation control system 5000 includes the identification sensing device 400, the presentation display device 300, a control identification sensing device 420, the controller 5100, the memory 5200, the identification controller 5300, the I/O interface 5400, the presentation controller 5500, the presentation elements 5220–5260, the presentation element identifiers 5272–5280, the controllable elements 5242 and 5262, and the control element identifiers 4292 and 4294 stored in the memory 5200, and one or more tangible sensible identification-carrying devices 410 and/or one or more controllable element identification-carrying devices 430.

Once the control identification-carrying devices 430 have been produced by the presentation control system 4000, a user can use the control identification-carrying devices 430 during a presentation. The particular control identification-carrying device 430 for a desired presentation element, or more particularly for a control associated with the controllable element, is identified by the user based on the mnemonic that is attached to, or otherwise associated with, one of the control identification-carrying devices 430. The control identification-carrying device 430, is placed, at least momentarily, in the sensible area of the control identification sensing device 420. The control identification sensing device 420 outputs, via the I/O interface 5400 and the link 5010, the control identification information associated with that particular controllable element identification-carrying device 430. Optionally, an amalgamated identification sensing device and control identification sensing device can output a sensed presentation element identifier and control identification. The identification controller 5300 associates the control element identifier information received from the control identification-carrying device 430 with a particular control element based on the control element identifiers stored in the control element identification memory 5290. The identification controller 5300 then outputs a signal to the presentation controller 5500 corresponding to the selected presentation control element. The presentation controller 5500 retrieves, via the link 5010, a particular presentation element indicated by the received signal. The signal representing the selected presentation element is then output via the link 5010 and the I/O interface 5400 to the presentation display device 300 and displayed. The identification controller 5300 queries the control identification memory 5290 to retrieve the control function associated with the sensed controllable element. The presentation controller 5500 then executes the control function identified by the control identification for the selected controllable element. A signal representing the function of the controllable element is then output via the link 5010 and the I/O interface 5400 to the controller 5100 to effect the associated function.

The control identification-carrying device 430 can be continuously "on" or require a supplemental action by the user before the control identification is transferred to the control identification sensing device 420. For example, the control identification-carrying device 430 could be a "next" control identification-crying device similar to that shown in FIG. 14. In this case, instead of the control identification sensing device 420 "reading" the barcodes, when the controllable element identification-carrying device 430 is placed in the sensible area of the control identification sensing device 420, the controllable element identification is transferred to the control identification sensing device 420.

Alternatively, the control identification-carrying device can have incorporated into it a "switch." In this case, a secondary action by the user is required to invoke the transfer of the control identification from the control identification-carrying device 430 to the control identification sensing device 420. For example, the control identification-carrying device 430 could have incorporated into it a microswitch. If a user placed the control identification-carrying device 430 into the sensible area of the control identification sensing device 420 nothing would happen. Then, upon the user pressing the microswitch, the control identification-carrying device 430 transfers the control identification to the control identification sensing device 420. In this manner, the controllable elements are activated when the control function associated with a controllable element is transferred to the control identification sensing device 420. Furthermore, this allows the user greater versatility and freedom from a fixed location. For example, the control identification carrying device 430 could be a radio frequency or infrared control identification-carrying device. Therefore, as long as a user is within the sensible distance of the control identification sensing device 420, the control identification would be transferred from the control identification-carrying device 430 to the control identification sensing device 420.

Alternatively, any type of switch device can be incorporated into the control identification-carrying device for triggering transfer of the control identification to the control identification sensing device. For example, the switch can be one or more pushbuttons (e.g., membrane switches and/or microswitches), one or more dip switches, one or more proximity switches, for example, magnetic or capacitative proximity switches, one or more piezo elements, light sensitive elements, resistive tapes, and/or simple electrical contacts, such as +/– conductive contacts that may be closed by applying any conductive material across the contacts.

Figure 21:
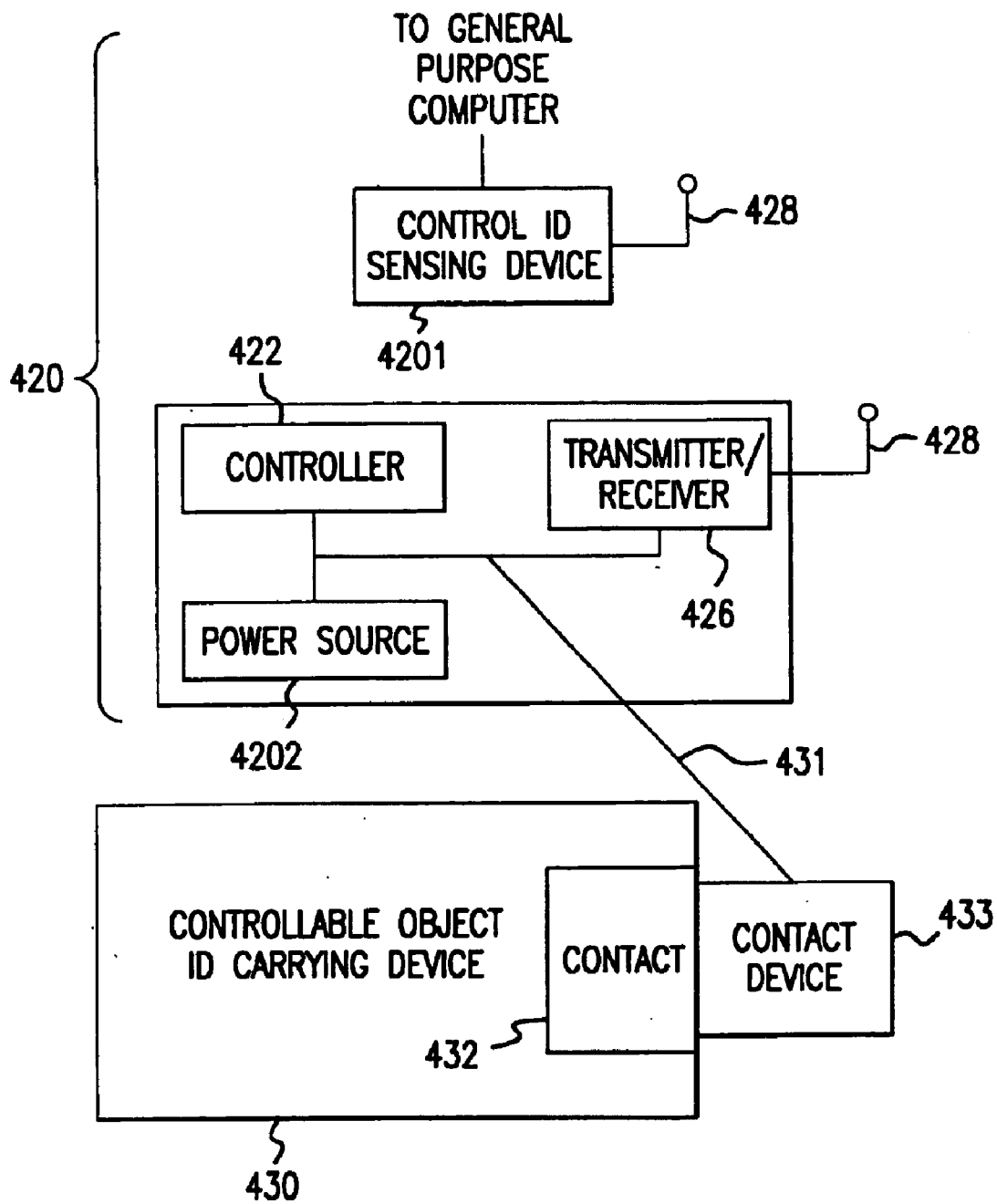
FIG. 21 is a sixth aspect of the presentation control system according to this invention.

For example, FIG. 21 illustrates an alternative embodiment of the control identification sensing device 420 and control identification-carrying device 430. In this embodiment, the control identification sensing device 420 is separated into two parts. The first part, or base unit 4201, comprises a transmitter/receiver (not shown) and an antenna 428. A remote station 4202 comprises a controller 422, a power source 424, a transmitter/receiver 426 and an antenna 428. Additionally, the remote station 4202 is connected via a link 431 to a contact device 433. In this exemplary embodiment, the control-identification-carrying device 430 comprises an electrical or electro/mechanical contact 432. As the contact device 433 is brought into contact with the contact 432, the control identification associated with a control identification-carrying device 430 is transmitted via the link 431 to the remote station 4202. The remote station 4202, under the direction of controller 422, transfers the control identification via transmitter/receiver 426 and antenna 428 to the base station 4201. The control identification is then transferred to the presentation control system as previously described.

For example, the remote station 4202 can be a wristband or belt attachable device worn by the user and the contact device 433 can be a device fitted to a user's finger. In this instance, the user's finger only need come in contact with a control identification-carrying device 430 in order to transfer the control identification to the presentation control system 5000. Alternatively, for example, the remote station can be a hand held scanner with an incorporated contact device. In general, the remote station and contact device can be any device, or combination of devices, capable of transferring the control identification from the identification-carrying device to the presentation control system.

Figure 22:
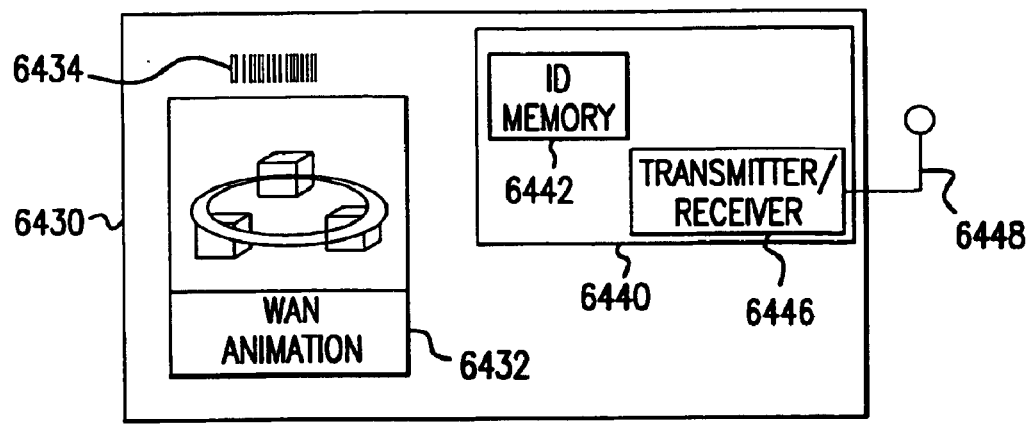
FIG. 22 illustrates a sixth exemplary identification-carrying device.

FIG. 22 illustrates an exemplary embodiment of a control identification-carrying device 6430. In this embodiment, the control identification-carrying device 6430 comprises a barcode 6434, representing a presentation element identifier, a mnemonic 6432, and a control portion 6440. The control portion comprises a control identification memory 6442, a transmitter/receiver 6446 and an antenna 6448. In use, a user would place this combined identification-carrying device and control identification-carrying device into the sensible area of the identification sensing device 400. The identification sensing device 400 would read the barcode 6434 to extract the presentation element identifier. The presentation display device 300 would then display, for example, a first friame or opening screen of the "WAN animation." The user, knowing that there is a controllable element associated with the identification-carrying device 6430, based on, for example, the mnemonic 6432, could then invoke the controllable element at any time. For example, the user, by placing the identification-carrying device 430 in the sensible area of the control identification sensing device 420, could trigger playing of the "WAN animation." In this instance, since this exemplary control identification device is always "on," the control identification would be retrieved from control identification memory 6442, transmitted to the transmitter/receiver 6446 and, via antenna 6448, to the control identification sensing device 420. Then, for example, if the control identification associated with the identification-carrying device 6430 corresponded to "play" of the "WAN animation," playing of the animation would begin.

Figure 23:
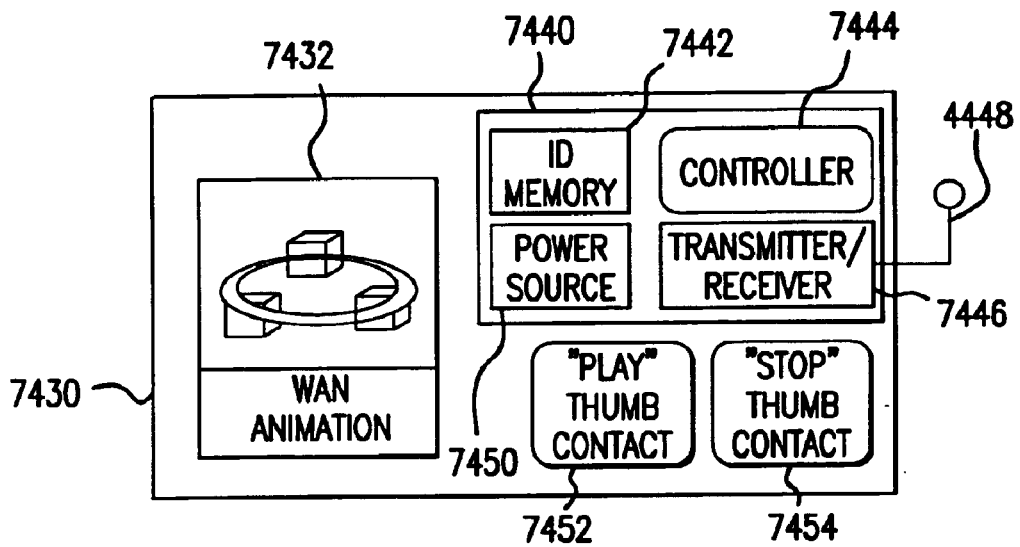
FIG. 23 illustrates a seventh exemplary identification-carrying device.

FIG. 23 shows an alternative embodiment of a switchable identification-carrying device 7430. This identification-carrying device comprises a mnemonic 7432, a control portion 7440, and two contacts 7452 and 7454. In this embodiment, the identification portion 7440 of the identification-carrying device 7430 carries both a presentation element identifier and a control identifier. The identification portion 7440 comprises an identification memory 7442, a controller 7444, a transmitter/receiver 7446, an antenna 7448, a power source 7450, a "play" thumb contact 7452 and a "stop" thumb contact 7454. This identification-carrying device 7430 could be used in conjunction with the two-part control identification sensing device 420 illustrated in FIG. 21. For example, the thumb contact 7452 and 7454 could be electrical or electromechanical contacts. As the contact device 433 comes in contact with the "play" thumb contact 7452, the presentation element identifier and control identifier are transferred from the identification memory 7442, under the direction of controller 422, via the contact device 433 and the link 431, to the transmitter/receiver 426. The transmitter/receiver 426 then forwards the presentation element identifier and control identifier, via antenna 428, to the control identification sensing device 4201. Alternatively, the thumb contact 7452 and 7454 could be electrical or electromechanical switches. As the thumb contacts are activated, the presentation element identifier and the control identifier are transferred from the identification memory 7442, under the direction of controller 7444, to the transmitter/receiver 7446. The transmitter/receiver 7446 then forwards the presentation element identifier and control identifier, via antenna 7448, to the control identification sensing device 420.

The power source 7450 can be any known or later developed power source capable of supplying power to the identification portion 7440. For example, the power source could be a battery, solar cell, or the like. The identification portion 7440 could also be passively powered, as in passive RF transponders, such as those disclosed in U.S. Pat. No. 5,598,162, incorporated herein by reference in its entirety.

Additionally, the thumb contacts 7452 and 7454 can be any type of switch that is "closed" by an interaction of the user. For example, the contacts 7452 and 7454 can be optical switches, microswitches, or the like.

Figure 24:
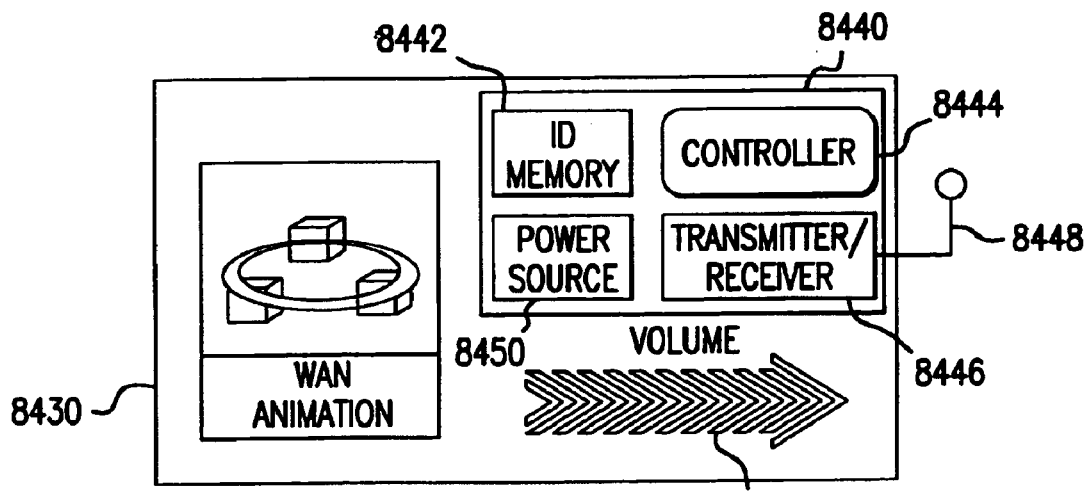
FIG. 24 illustrates an eighth exemplary identification-carrying device.

FIG. 24 illustrates another exemplary embodiment of an identification-carrying device 8430. The identification-carrying device 8430 comprises a mnemonic 8432, an identification portion 8440, and a resistive strip, i.e., a switch, 8452. As with the previous embodiments, the identification portion 8440 comprises an identification memory 8442, a controller 8444, a power source 8450, a transmitter/receiver 8446 and an antenna 8448. In use, the user would place, for example, the user's thumb over a portion of the resistive strip 8452. The resistive values of the resistive strip 8452 would have an associated control identification stored in identification memory 8442. These control identifications would correspond to, for example, a sound volume, of the "WAN animation." Therefore, as a user traversed, or triggered, a portion of the resistive strip 8452, a control identification associated with that particular portion would be transmitted to the control identification sensing device 420.

Figure 25:
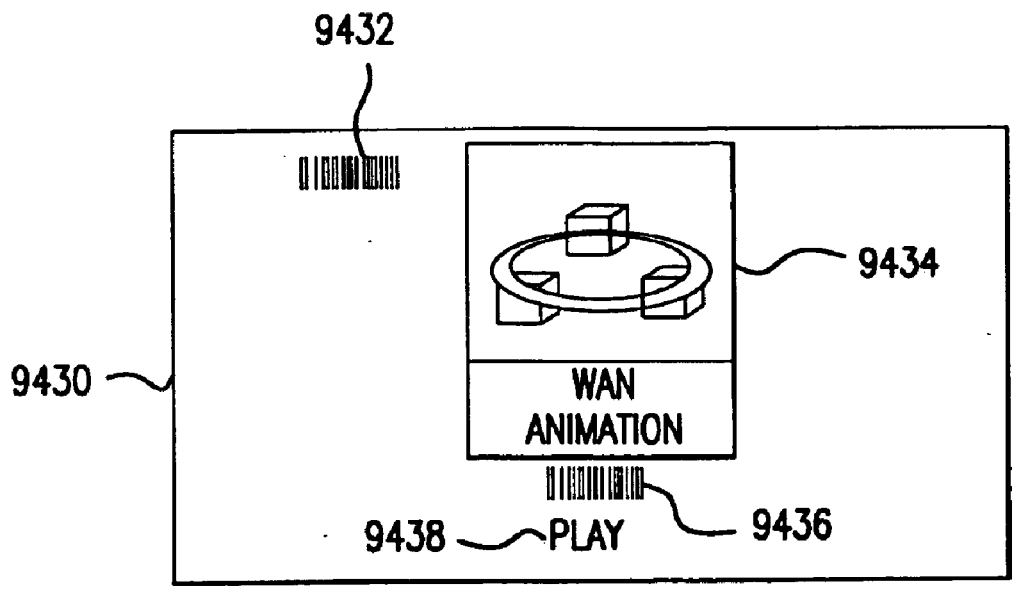
FIG. 25 illustrates a seventh exemplary identification-carrying device.

FIG. 25 illustrates another embodiment of an identification-carrying device 9430. The identification-carrying device 9430 comprises a barcode 9432, a mnemonic 9434, a barcode 9436 and a control mnemonic 9438. The barcode 9432 identifies the presentation element identifier associated with the identification-carrying device 9430. The barcode 9436 identifies the control identification associated with the presentation element represented by the mnemonic 9434. In use, a user would place this combined identification-carrying device and control identification-carrying device into the sensible area of the identification sensing device 400. The identification sensing device 400 would read the barcode 9432 to extract the presentation element identifier. The presentation display device 300 would then display, for example, a first frame or opening screen of the "WAN animation." The user, knowing that there is a controllable element associated with the identification-carrying device 9430, based on, for example, the mnemonic 9438, could then invoke the controllable element at any time. For example, the user, by placing the identification-carrying device 9430 in the sensible area of the control identification sensing device 420, could trigger displaying of the "WAN animation." In this instance, since the control identification is associated with the barcode 9436, the user would pass the identification-carrying device, and specifically barcode 9436, into the sensible area of the control identification sensing device 420. The sensed control identification would then be transferred to the presentation control system 5000. Then, for example, if the control identification associated with the identification-carrying device 9430 corresponded to "play" of the "WAN Animation," playing of the animation would begin.

Figure 26:
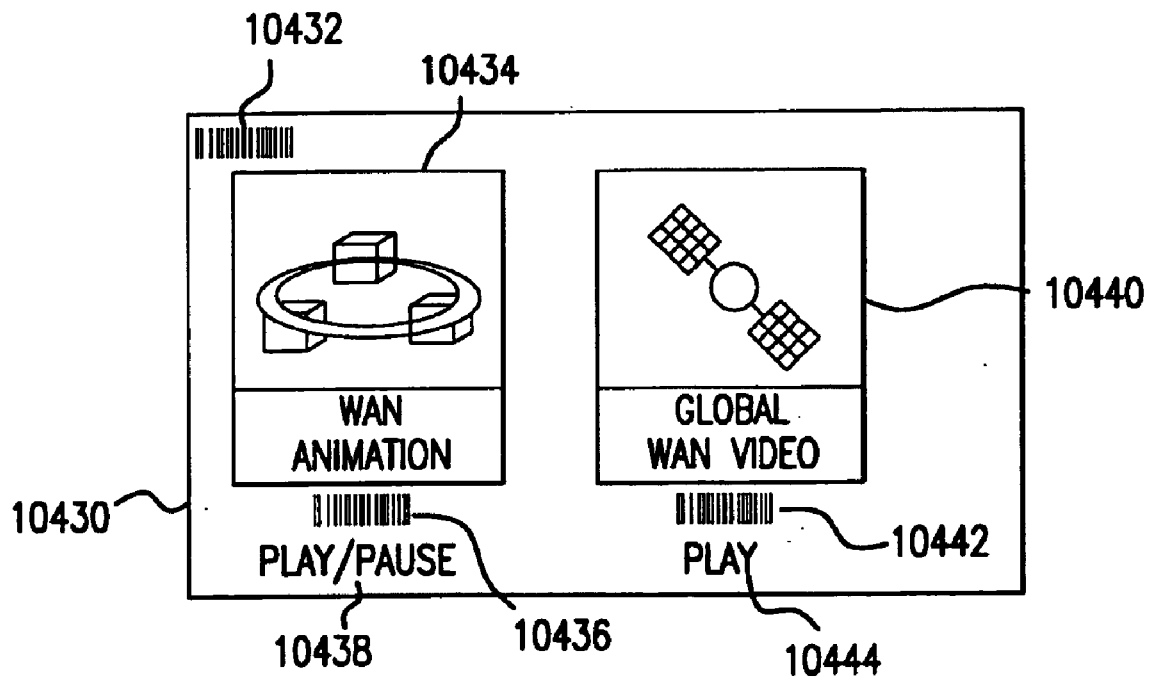
FIG. 26 illustrates an eighth exemplary identification-carrying device.

FIG. 26 illustrates another embodiment of an identification-carrying device 10430. This exemplary identification-carrying device has two controllable elements associated with the same device. The identification-carrying device 10430 comprises a barcode 10432, a mnemonic 10434, a barcode 10436, a mnemonic 10438, a mnemonic 10440, a barcode 10442 and a mnemonic 10444. The barcode 10432 identifies the presentation element identifier associated with the identification-carrying device 10430. The barcode 10436 identifies the control identification. associated with the controllable element represented by the mnemonic 10434. The barcode 10442 identifies the control identification associated with the second controllable element represented by the mnemonic 10440. In use, a user would place this combined identification-carrying device and control identification-carrying device into the sensible area of the identification sensing device 400. The identification sensing device 400 would read the barcode 10432 to extract the presentation element identifier. The presentation display device 300 would then display, for example, an opening slide introducing WAN'S. The user, knowing that there are two controllable elements associated with the identification-carrying device 10430, based on, for example, the mnemonics 10434 and 10440, could then invoke either controllable element at any time. For example, the user, by placing the identification-carrying device 10430 in the sensible area of the control identification sensing device 420, could trigger displaying of the "WAN animation." In this instance, since the control identification for the "WAN Animation" is associated with the barcode 10436, the user would pass the identification-carrying device, and specifically barcode 10436, into the sensible area of the control identification sensing device 420. The sensed control identification would then be transferred to the presentation control system 5000. Then, for example, if the control identification associated with the identification-carrying device 10430 corresponded to "play" of the "WAN Animation," playing of the animation would begin. Furthermore, if, for example, the barcode 10436 is reintroduced to the control identification sensing device 420 while the "WAN Animation" is playing, the presentation control system could pause playing of the animation. Alternatively, if a used decides to play the "Gobal WAN Video," the user would pass the identification-carrying device, and specifically barcode 10440, into the sensible area of the control identification sensing device 420. The sensed control identification would then be transferred to the presentation control system 5000. Then, the control identification associated with the identification-carrying device would be activated.

The tangible sensible identification-carrying device 410, as previously noted, can be any device capable of carrying the mnemonic relating to the presentation element identifier associated with the presentation element identifier contained in that tangible sensible identification-carrying device 410.

While the identification-carrying device generator 200 and the identification sensing device 400 can be separate components, such as a printer and a scanner, respectively, the identification-carrying device generator 200 and the identification sensing device 400 can be incorporated into a single device or can be different aspects of a single device.

Specifically, the identification-carrying device generator 200 only needs to associate a mnemonic and the presentation element identifier with the tangible sensible identification-carrying device. The tangible sensible identification device 410, in turn needs only to be readable by the identification sensing device 400.

The identification-carrying device generator 200 and the identification sensing device 400 can be, but are not limited to, any of the following combinations. For example, a printer and a scanner can be used as the identification-carrying device generator 200 and the identification sensing device 400, respectively. In this exemplary embodiment, the printer prints the mnemonic and the associated presentation element identifier onto a printable medium, such as a card stock, a page of a notebook, a sheet of paper, or transparency or the like. The scanner, when presented with the printed media, reads the presentation element identifier from the printed medium and forwards the read presentation element identifier via the I/O interface 3400 to the presentation control system 3000.

Alternatively, the identification-carrying device generator 200 and the identification sensing device could be a barcode writer and a barcode reader, respectively. In this exemplary embodiment, where a barcode is used as the tangible sensible presentation element identifier, the barcode writer writes the barcode to a tangible sensible identification-carrying device, printable medium, such as the printable media described above, as well as adhesive tape or stickers. This device or medium is then placed in a sensible area of the identification sensing device 400 for reading.

The tangible sensible identification-carrying device need not be limited to printed media. Alternatively, the tangible sensible identification-carrying device can be a physical device such as a microchip or other device capable of carrying information based on its mechanical, electrical or magnetic properties. For example, the tangible sensible identification-carrying device can be an ultrasonic transmitter and the identification sensing device an ultrasonic receiver. Upon placing the ultrasound emitting identification-carrying device in the sensible area of the identification sensing device, the identification sensing device reads the presentation element identifier from the tangible sensible identification-carrying device.

Alternatively, the tangible sensible identification-carrying device could maintain, transmit or respond to an electric or magnetic field. The identification sensing device would then produce an electromagnetic field into which the tangible sensible identification-carrying device can be placed. When the tangible sensible identification-carrying device is placed in the sensible area of the identification sensing device, the tangible sensible identification-carrying device becomes capacitively, inductively, or otherwise electromechanically coupled to the identification sensing device generator, and the information can be extracted from the tangible sensible identification-carrying device and correlated to the particular presentation element identifier.

Furthermore, the identification-carrying device generator could be a chip burner and the identification sensing device a chip reader. In this embodiment, the identification-carrying device generator would program the presentation element identifier onto the tangible sensible identification-carrying device. The chip, when placed in the sensible area of the identification sensing device could then be read and interpreted by the presentation control system 3000.

Furthermore, the identification-carrying device generator could be capable of producing micro machines and micro electromechanical systems. In this embodiment, the identification sensing device could be an interface to retrieve the information contained in the micro machine or a micro electromechanical system.

In summary, the identification-carrying device generator 200 and identification sensing device 400 can be any device, or combination thereof, which is capable of respectively recording at least a presentation element identifier and a mnemonic onto a tangible sensible identification-carrying device which can then be read by the sensor to retrieve the presentation element identifier.

The presentation display device 300 can be any device capable of displaying electronic media or multimedia to an audience, such as an overhead projector, a large screen TV, a video projector, a slide projector or the like.

Figure 27:
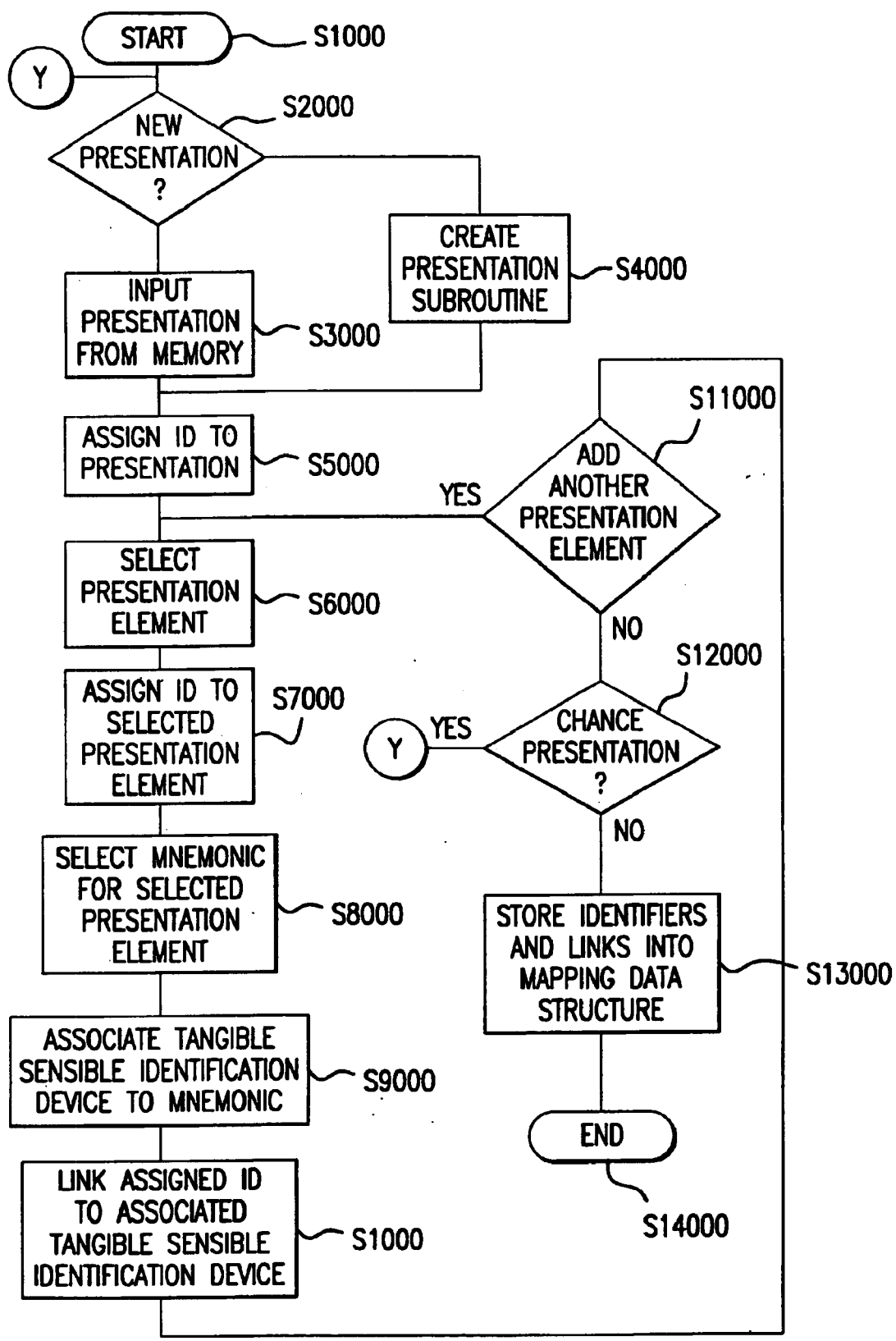
FIG. 27 is a flowchart outlining one embodiment of a method for associating mnemonics with presentation elements according to this invention.

FIG. 27 is a flowchart outlining one embodiment of the method for associating mnemonics and presentation element identifiers to presentation elements and tangible sensible identification-carrying devices according to this invention. Control begins in step S1000. In step S2000, a determination is made as to whether a new presentation is being created. If a new presentation is being created, control jumps to step S4000. Otherwise control continues to step S3000. In step S4000 a new presentation is created. Control then continues to step S5000. In step S3000, the desired presentation is input. Control then jumps to step S5000.

In step S5000, a presentation identifier is assigned to the input presentation. Next, in step S6000, a presentation element within the input presentation is selected. Then, in step S7000, a presentation element identifier is assigned to the selected presentation element. Next, in step S8000, a mnemonic for the selected presentation element is selected. Control then continues to step S9000.

In step S9000, the tangible sensible identification device is associated with the mnemonic. As previously discussed, this can encompass printing the mnemonic on a printable medium, writing a representation of the mnemonic to a microchip, printing the mnemonic on a paper sheet or card stock, or any other method which is capable of associating a mnemonic representing a presentation element with a physical sensible identification-carrying device. Next, in step S10000, the associated tangible sensible identification-carrying device is linked to the assigned identifiers, presentation and presentation elements. Then, in step S11000, a determination is made as to whether another presentation element of the selected presentation needs to be associated with a tangible sensible identification-carrying device. If so, control jumps back to step S6000. Alternatively, if no other elements are desired, control continues to step S12000.

In step S12000, a determination is made whether the selected presentation of steps S2000 needs to be changed to a different presentation. If so, control then jumps back to step S2000, otherwise, control continues to step S13000. In step S13000, the identifier links are stored into a mapping data structure. Control then passes to step 14000, where the control sequence ends.

Figure 28:
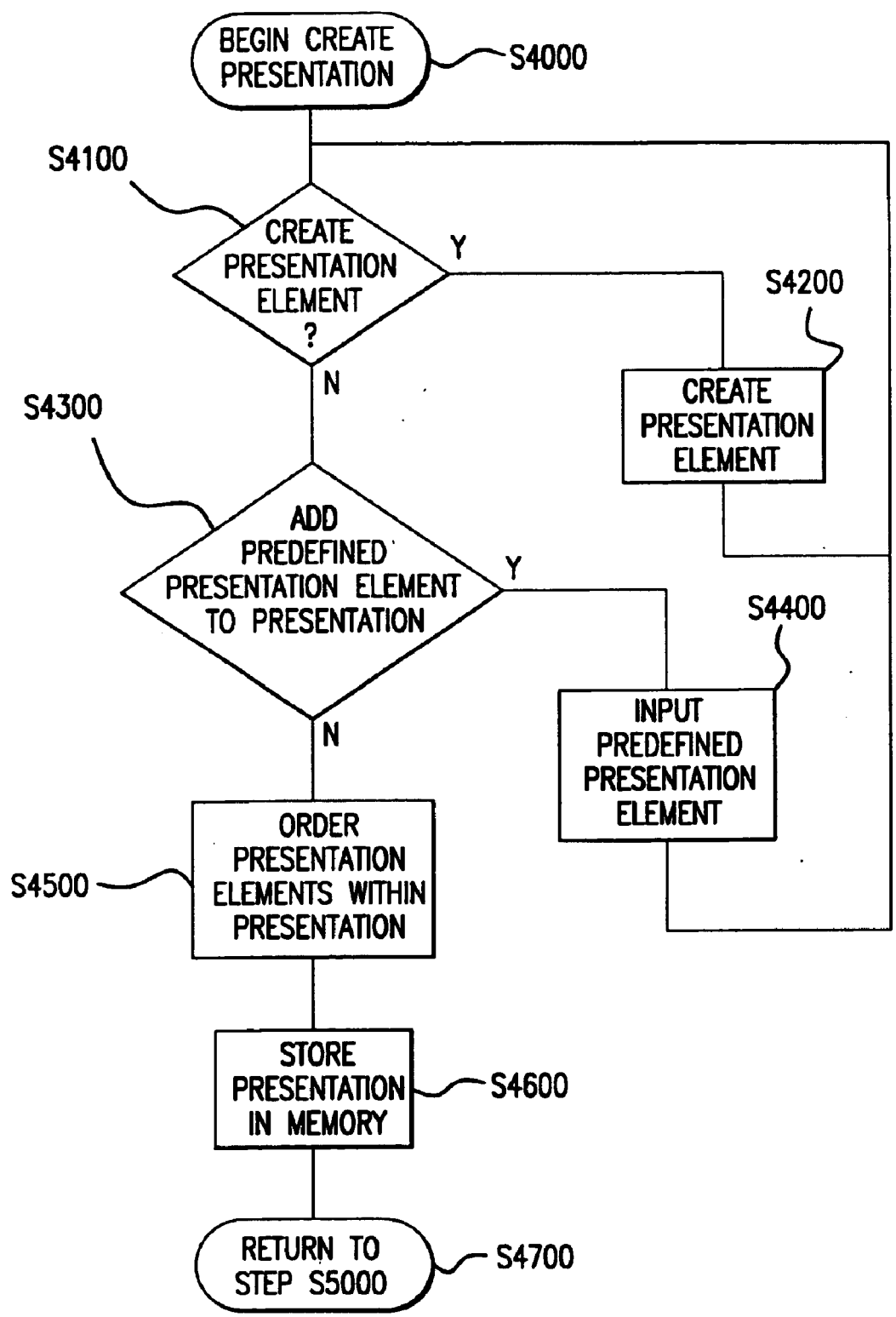
FIG. 28 is a flowchart outlining one method for creating a presentation according to this invention.

FIG. 28 is a flowchart outlining one exemplary embodiment of the presentation creation in of FIG. 27 in greater detail. Control commences in step S4000. Then, in step S4100, a determination is made to create a presentation element. If a presentation element is to be created, control continues to step S4200. Otherwise, control jumps to step S4300. In step S4200, the user creates a presentation element. Control then jumps back to step S4100.

In step S4300, a determination is made as to whether to add a predefined presentation element to a presentation. If a presentation element is to be added, control continues to step S4400. Otherwise control jumps to step S4500. In step S4400, a predefined presentation element is input. Control then jumps back to step S4100.

In step S4500, the presentation elements within a presentation are ordered. Next, in step S4600, the presentation is stored in memory. Then, in step S4700, control returns to step S5000 of FIG. 27.

Figure 29:
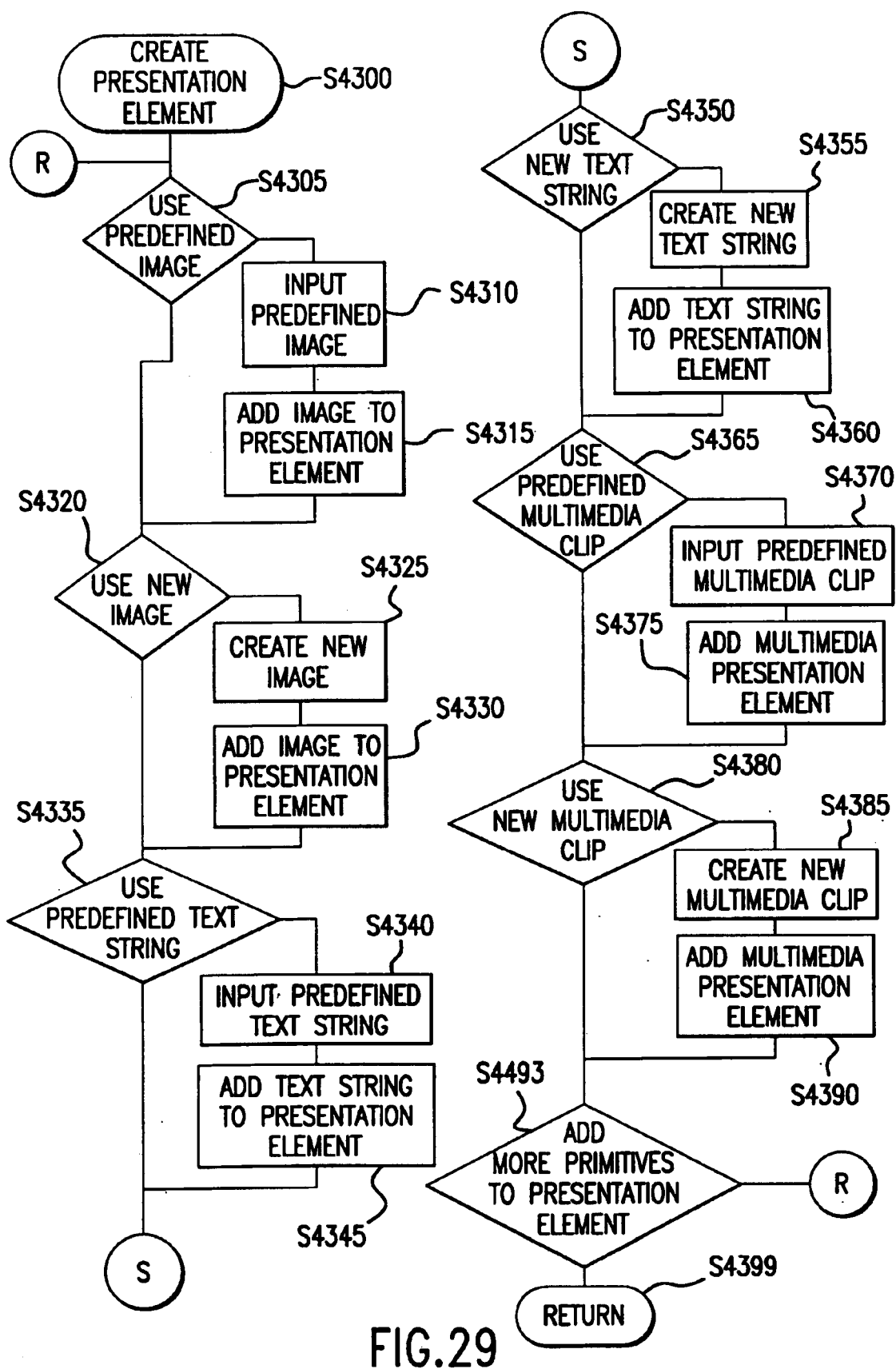
FIG. 29 is a flowchart outlining one exemplary method for creating the presentation element in FIG. 25.

FIG. 29 is a flowchart outlining in greater detail one exemplary embodiment of the presentation element creation step of FIG. 28. Beginning in step S4300, control continues to step S4305, where a determination is made as to whether a predefined image will be used. If a predefined image will be used, control continues to step S4310. Otherwise, control jumps to step S4320.

In step S4310, a predefined image is input. Next, in step S4315, the image is added to the presentation element. Then, control continues to step S4320.

In step S4320, a determination is made as to whether a new image should be used. If a new image is desired, control continues to steps S4325. Otherwise, control jumps to step S4335.

In step S4325, a new image is created. Next, in step S4330, the new image is added to the presentation element. Then, control continues to step S4335.

In step S4335, a determination is made as to whether a predefined text string will be used. If a predefined text string is desired, control continues to step S4340. Otherwise, control jumps to step S4350.

In step S4340, a predefined text string is input. Next, in step S4345, the text string is added to the presentation element. Then, control continues to step S4350.

In step S4350, a determination is made for using a new text string. If a new text string is desired, control continues to step S4355. Otherwise, control jumps to step S43S5.

In step S4355, a new text string is created. Next, in step S4360, the text string is added to the presentation element. Then, control continues to step S4365.

In step S4355, a determination is made as to whether to use a predefined multimedia clip. If a predefined multimedia clip is desired, control continues to step S4370. Otherwise, control jumps to step S4380.

In step S4370, the predefined multimedia clip is input. Next, in step S4375, the multimedia clip is added to the presentation element. Then, control continues to step S4380.

In step S4380, a determination is made as to whether a new multimedia clip is desired. If a new multimedia clip is desired, control continues to step S4385. Otherwise, control jumps to step S4395.

In step S4385, a new multimedia clip is created. Next, in step S4390, the multimedia clip is added to the presentation element. Then, control continues to step S4395.

In step S4395, a determination is made as to whether more primitives are to be added to the presentation element. If more primitives is desired, control jumps back to step S4305. Otherwise, control continues to step S4399. In step S4399, control returns to step S4400 of FIG. 26.

Figure 30:
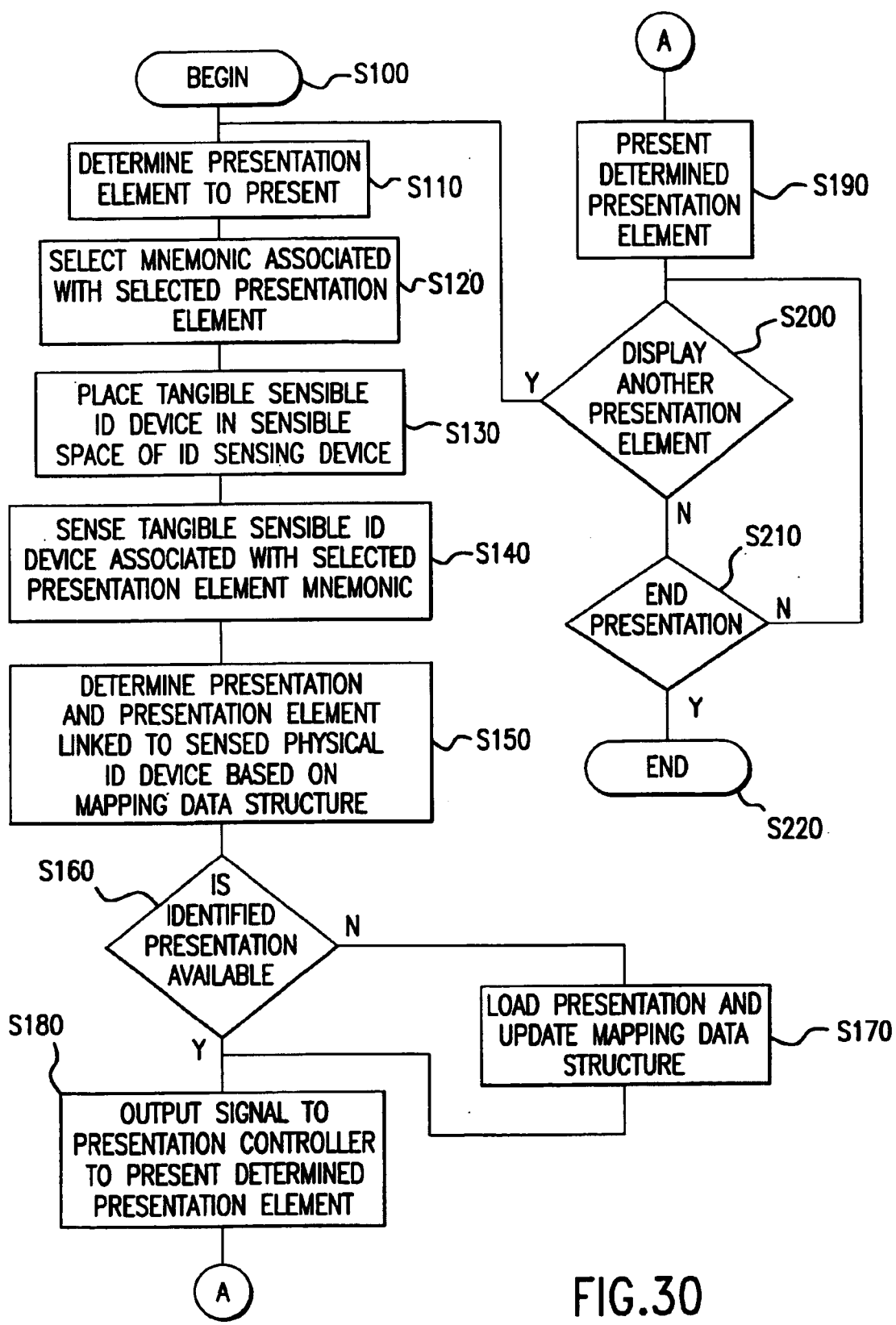
FIG. 30 is a flowchart outlining one method for controlling the operation of the presentation system according to this invention.

FIG. 30 illustrates the operation of the presentation system according to this invention. Control begins in step S100. Then, in step S110, a determination of which presentation element to present is made. Next, in step S120, a mnemonic associated with the selected presentation element is selected. Then, in step S130, the tangible sensible identification device is placed within the sensible space of the identification sensing device. Control then continues to step S140.

In step S140, the tangible sensible identification-carrying device associated with the selected presentation element mnemonic is sensed. Next, in step S150, the presentation and presentation element identified by the sensed tangible sensible identification-carrying device are determined. Then, in step S160, a determination is made as to whether the identified presentation is available. If the identified presentation is available, control jumps to step S180. Otherwise, control continues to step S1170.

In step S170, the identified presentation is loaded and the mapping structure is updated. Control then continues to step S180.

In step S180, a signal is output to the presentation controller to present the determined presentation element. Control then continues to step S190.

In step S190, the determined presentation element is presented. It should be appreciated, that, in general, any information on the tangible, sensible identification-carrying device, to the extent that it is not in the presentation element, is not displayed along with the presentation element. However, it should be appreciated that there may also be instances where that information, such as the presentation element identifier and/or the mnemonic, is also displayed. Next, in step S200, a determination is made as to whether another presentation element should be displayed If another presentation elements should not be displayed, control continues to step S210. Otherwise, if another presentation element should be displayed, control jumps back to step S1110.

In step S210, a determination is made whether to end the presentation. If ending of the presentation is not desired, control jumps back to step S210. Otherwise, control continues to step S220, where the control sequence ends.

Figure 31:
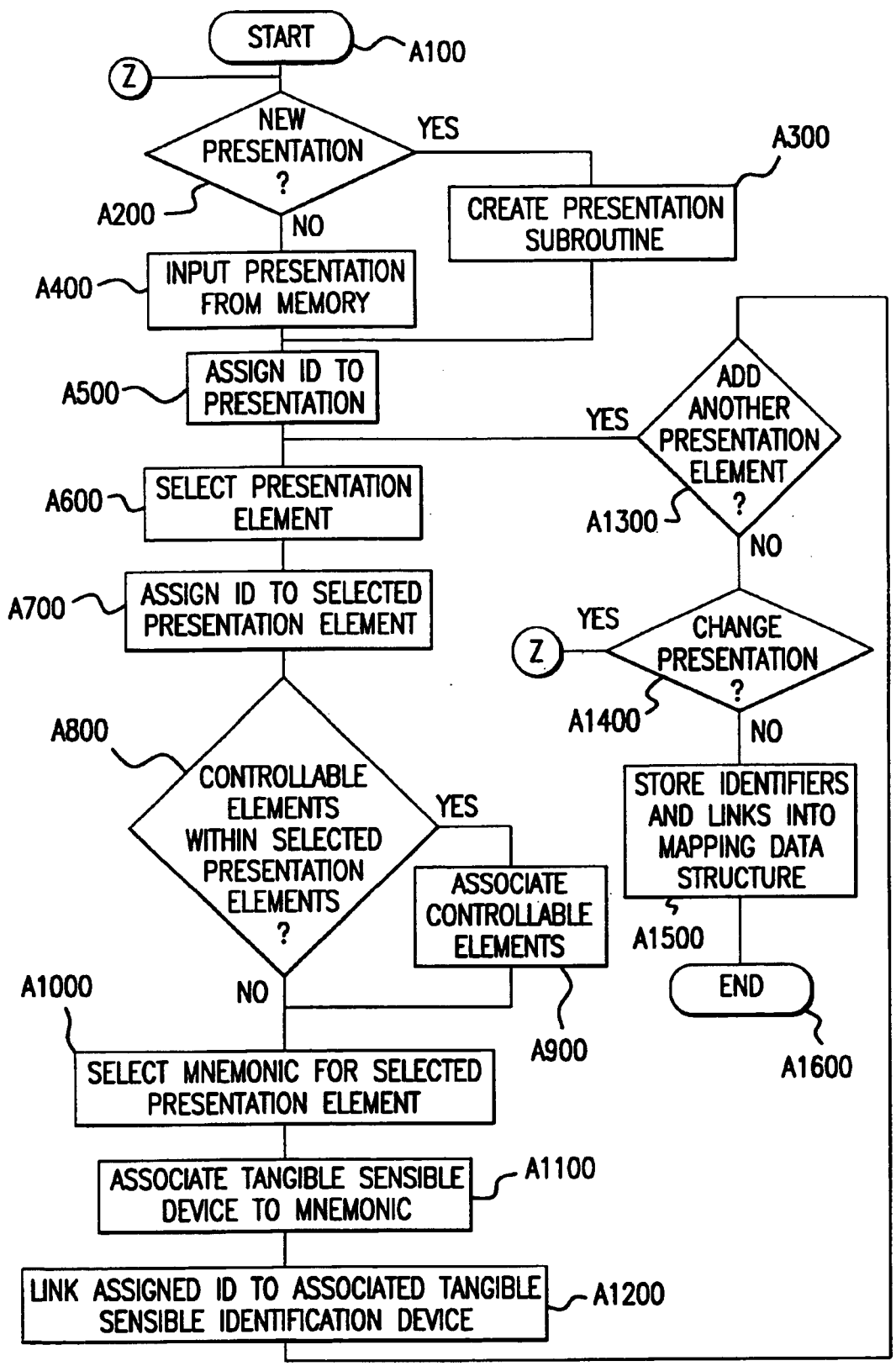
FIG. 31 is a flowchart outlining one embodiment of a method for associating drawing objects and controllable objects.

FIG. 31 is a flowchart outlining one exemplary embodiment of a method for associating control identifiers with controllable elements in a presentation control environment. Control begins in step A100 and continues to step A200, where a determination is made whether a new presentation is being created. If a new presentation is being created, control continues to step A300, otherwise control jumps to step A400. In step A300, a presentation is created as described above. Control then jumps to step A500. In contrast, in step A400, a presentation is loaded from memory. Control then continues to step A500.

In step A500, an identifier is assigned to the presentation. Then, in step A600, a presentation element is selected. Next, in step A700, an identifier is assigned to the selected presentation element. Control then continues to step A800.

In step A800, a determination is made whether controllable elements are present within the selected presentation element. If controllable elements are present, control continues to step A900, otherwise control jumps to step A1000. In step A900, the controllable elements are associated with control functions and the selected presentation element. Control then continues to step A1000.

In step A1000, a mnemonic is selected for the selected presentation element. Next, in step A1100, a tangible sensible identification device is associated with the mnemonic. Then, in step A1200, the assigned identifier is linked to the associated tangible sensible identification-carrying device.

In step A1300, a determination is made whether to add another presentation element. If another presentation element is desired, control jumps back to step A600. Otherwise, control continues to step A1400. In step A1400, a determination is made whether to change to a another presentation. If another presentation is desired, control jumps back to step A200, otherwise control continues to step A1500.

In step A1500, the identifiers and links are stored into a mapping data structure. Control then continues to step A1600, where the control sequence ends.

Figure 32:
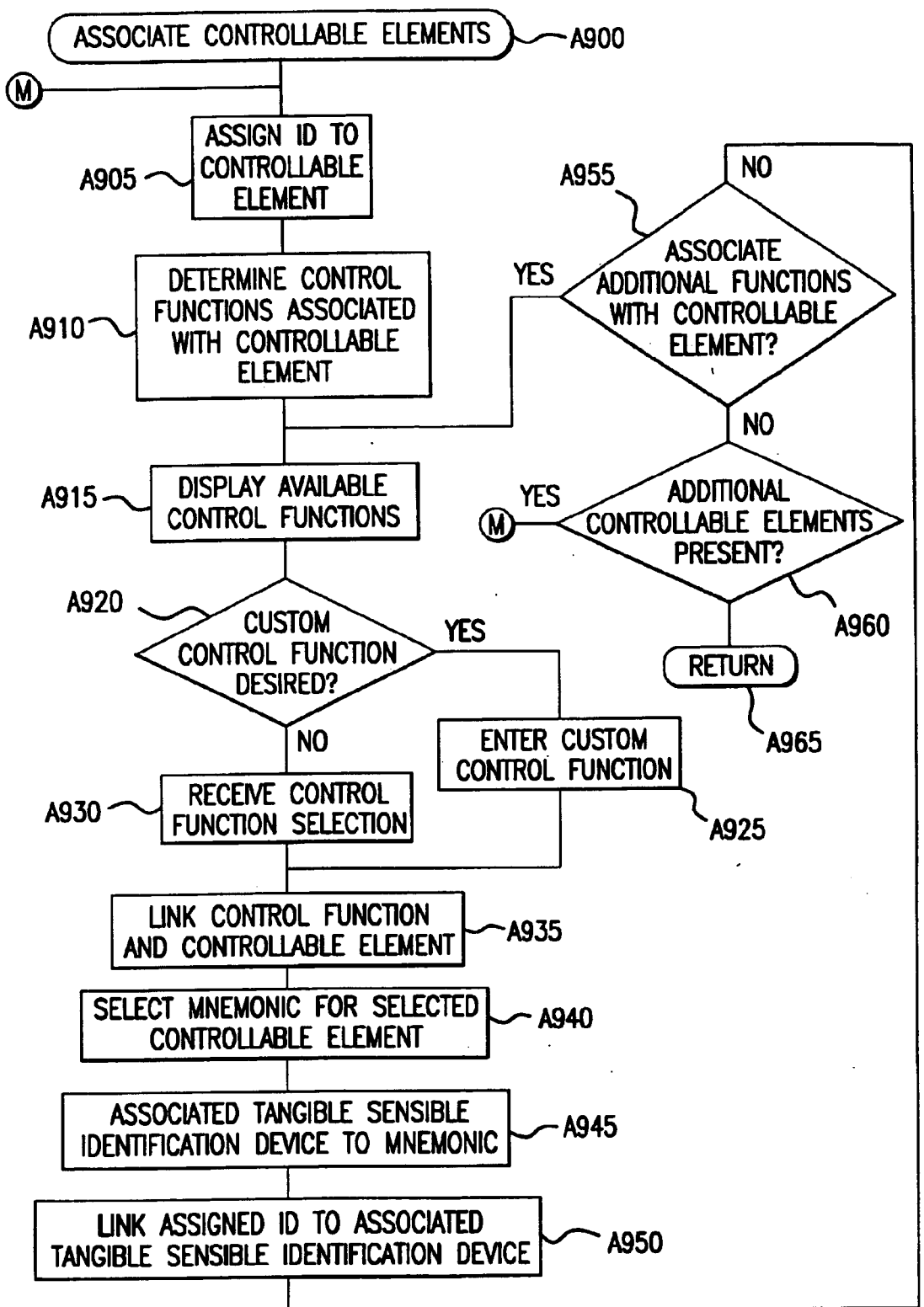
FIG. 32 is a flowchart outlining the perform association step of FIG. 29 in greater detail.

FIG. 32 is a flowchart showing in greater detail one exemplary embodiment of a method for associating the control elements shown in step A900 of FIG. 31. Control begins in step A900, and continues to step A905, where an identifier is assigned to a selected controllable element. Next, in step A910, the control function to be associated with the controllable element is determined. Then, in step A915, the available control functions for the selected controllable element are displayed. Control then continues to step A920.

In step A920, a determination is made whether a custom control function is desired. If a custom control function is desired, control continues to step A925. Otherwise, control jumps to step A930. In step A925, the custom control function is selected and/or input. Next, in step A930, the control function selection is received. Control then continues to step A935.

In step A935, the control function and the controllable element are linked. Next, in step A940, the mnemonic for the selected controllable element is selected. Then, in step A945 a tangible sensible identification device is associated with the selected mnemonic. Control then continues to step A950.

In step A950, the assigned identifier is linked to the associated tangible sensible identification-carrying device. Then, in step A955, a determination is made whether additional control functions are to be associated with the selected controllable element. If additional control functions are to be associated with the selected controllable element, control jumps back to step A915. Otherwise, control continues to step A960.

In step A960, a determination is made whether additional controllable elements are present within the selected presentation element. If additional controllable elements are present within the selected presentation element, control jumps back to step A905. Otherwise control continues to step A965, where the control sequence returns to step A1000.

Figure 33:
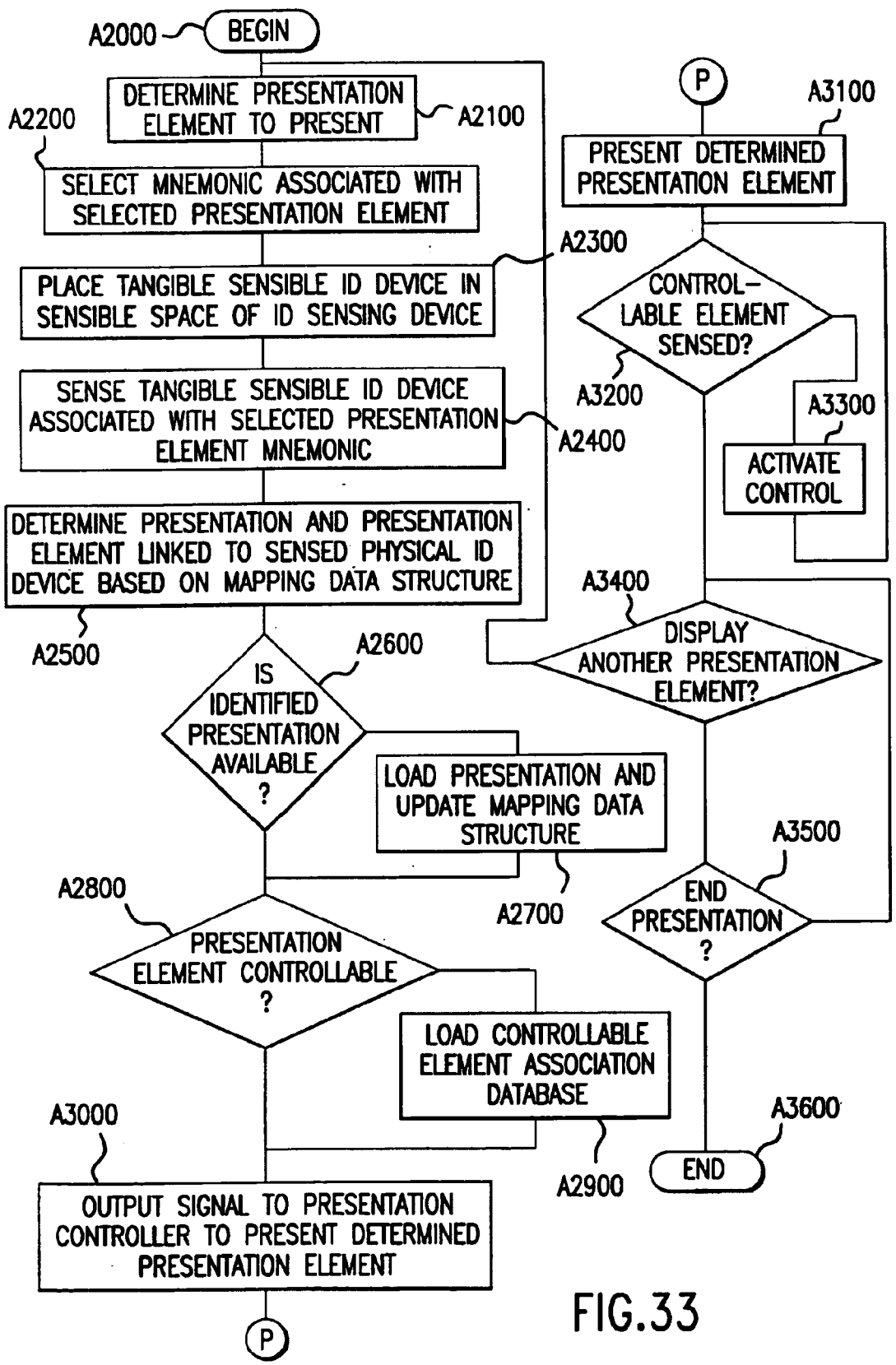
FIG. 33 is a flowchart outlining one exemplary method for controlling the operation of the presentation system according to this invention.

FIG. 33 is a flowchart outlining one exemplary embodiment of a method for operating a presentation system having controllable elements in accordance with this invention. Control begins in step A2000 and continues to step A2100, where the presentation element to be presented is determined. Next, in step A2200, a mnemonic associated with the selected presentation element is selected. Then, in step A2300, the tangible sensible identification device is placed within the sensible space of the identification sensing device. Control then continues to step A2400.

In step A2400, the tangible sensible identification-carrying device associated with the selected presentation element mnemonic is sensed. Next, in step A2500, the presentation and presentation element identified by the sensed tangible sensible identification-carrying device are determined. Then, in step A2600, a determination is made as to whether the identified presentation is available. If the identified presentation is not available, control continues to step A2700. Otherwise, control jumps directly to step A2800. In step A2700, the identified presentation is loaded and the mapping structure is updated. Control then continues to step A2800.

In step A2800, a determination is made whether a controllable element exists within the selected presentation element. If a controllable element is present, control continues to step A2900. Otherwise control jumps directly to step A3000. In step A2900, the controllable element association database is loaded. Control then continues to step A3000. In step A3000, a signal is output to the presentation controller to present the determined presentation element. Control then continues to step A3100.

In step A3100, the determined presentation element is presented. It should be appreciated, that, in general, any information on the tangible, sensible identification-carrying device, to the extent that it is not in the presentation element, is not displayed along with the presentation element. However, it should be appreciated that there may also be instances where that information, such as the presentation element identifier and/or the mnemonic, is also displayed.

In step A3200, a determination is made whether the tangible sensible identification device associated with the controllable element is sensed. If the controllable element is sensed, control continues to step A3300. Otherwise, control jumps to step A3400. In step A3300, the control function associated with the controllable element is activated. Control then jumps back to step A3200.

In contrast, in step A3400, a determination is made whether another presentation element should be displayed. If another presentation elements should not be displayed, control continues to step A3500. Otherwise, if another presentation element should be displayed, control jumps back to step A2100.

In step A3500, a determination is made whether to end the presentation. If ending the presentation is not desired, control jumps back to step A3400. Otherwise, control continues to step A3600, where the control sequence ends.

Figure 34:
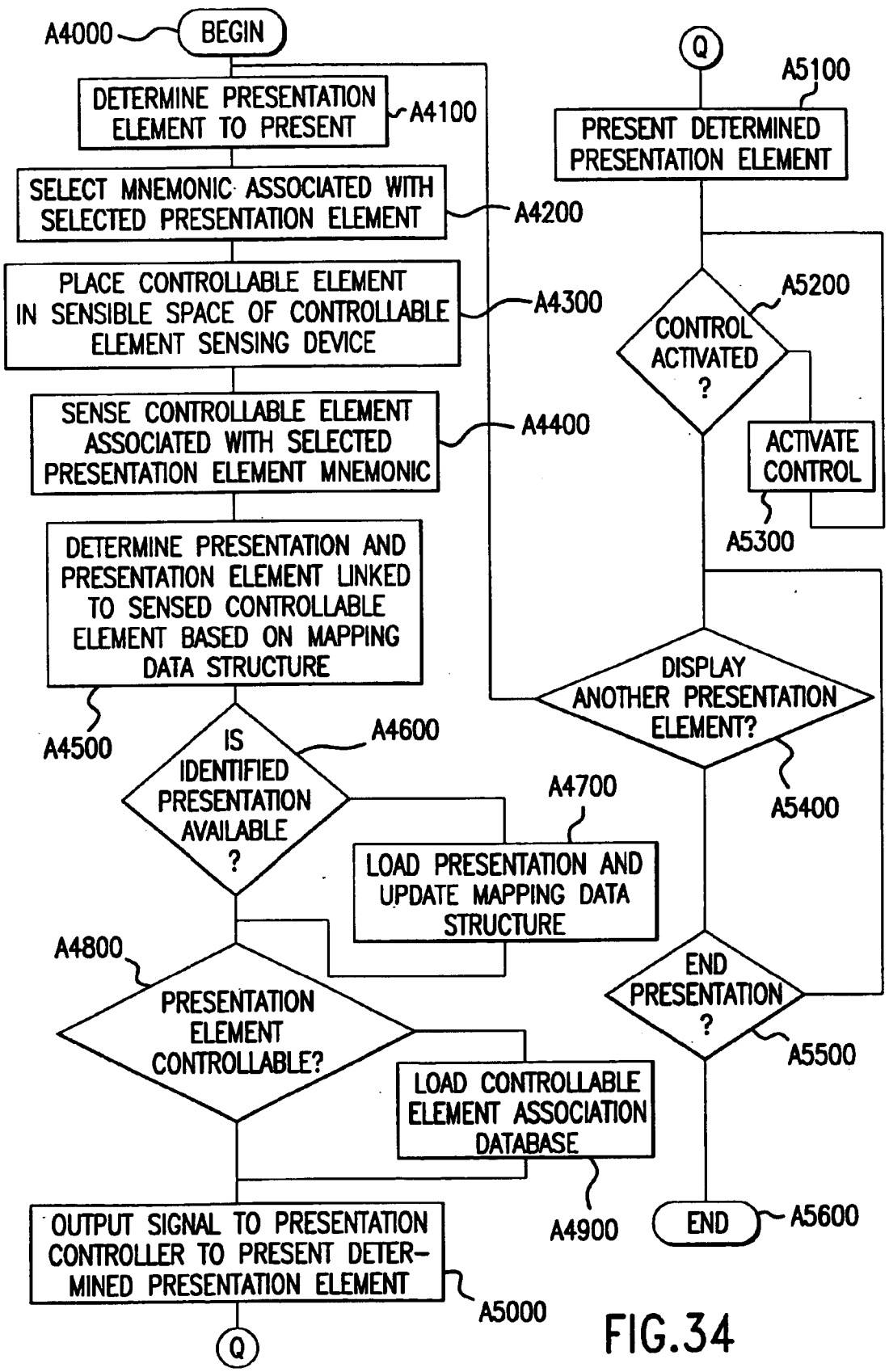
FIG. 34 is a flowchart outlining one method for controlling the operation of the presentation system according to this invention.

FIG. 34 is a flowchart, outlining one exemplary embodiment of a method for operating a presentation system by introducing controllable elements into the controllable element sensing device in accordance with this invention. Control begins in step A4000 and continues to step A4100, where a determination is made regarding which control function for a particular presentation element to present. Next, in step A4200, the mnemonic associated with the selected control function for the presentation element is selected. Then, in step A4300, the tangible sensible identification device is placed within the sensible space of the controllable element sensing device. Control then continues to step A4400.

In step A4400, the tangible sensible identification-carrying device associated with the selected control function mnemonic is sensed. Next, in step A4500, the presentation and presentation element identified by the sensed tangible sensible identification-carrying device are determined. Then, in step A4600, a determination is made whether the identified presentation is available. If the identified presentation is available, control continues to step A4700. Otherwise, control jumps directly to step A4800. In step A4700, the identified presentation is loaded and the mapping structure is updated. Control then continues to step A4800.

In step A4800, a determination is made whether a controllable element exists within the selected presentation element. If a controllable element is present, control continues to step A4900. Otherwise control jumps directly to step A5000. In step A4900, the controllable element association database is loaded. Control then continues to step A5000. In step A5000, a signal is output to the presentation controller to present the determined presentation element. Control then continues to step A5100.

In step A5100, the determined presentation element is presented. It should be appreciated, that, in general, any information on the tangible, sensible identification-carrying device, to the extent that it is not in the presentation element, is not displayed along with the presentation element. However, it should be appreciated that there may also be instances where that information, such as the presentation element identifier and/or the mnemonic, is also displayed.

In step A5200, a determination is made whether the tangible sensible identification device associated with the controllable element is sensed. If the controllable element is sensed, control continues step A5300. Otherwise, control jumps to step A5400. In step A5300, the control function associated with the controllable element is activated. Control then jumps back to step A5200.

In contrast, in step A5400, a determination is made whether another presentation element should be displayed. If another presentation elements should not be displayed, control continues to step A5500. Otherwise, if another presentation element should be displayed, control jumps back to step A5100.

In step A5500, a determination is made whether to end the presentation. If ending the presentation is not desired, control jumps back to step A5400. Otherwise, control continues to step A5600, where the control sequence ends.

As shown in FIGS. 1–3 and 19–21, the presentation system is preferably implemented either on a single program general purpose computer or separate program general purpose computers, with associated tangible sensible identification-carrying devices. However, the presentation system can also be implemented on a special purpose computer, a programmed microprocessor or microcontroller and peripheral integrated circuit elements, and ASIC or other integrated circuit, a digital signal processor, a hard wired electronic or logic circuit such as a discreet element circuit, a programmable logic device such as a PLD, PLA, FPGA or PAL, or the like. In general, any device, capable of implementing a finite state machine that is in turn capable of implementing the flowcharts as shown in FIGS. 19–22 and 27–34, can be used to implement the presentation system.

The links 431, 1010, 2010 and 3010 can be a wired or wireless link or any known element that is capable of supplying electronic data to and from the connected elements.

The systems and methods for controlling a presentation using physical objects according to this invention have been implemented as two programs running under WINDOWS 95/NT, although a comparable operating system could be used. One program, the converter, implements the identification-carrying device generating system shown in FIG. 2 and the identification device generating steps S500–S13000 of FIG. 19. The second program, the controller, implements the presentation control system shown in FIG. 3, and the presentation control method shown in FIG. 27. Before a presentation is given, the converter is used to create cards from the presentation. The controller runs during a presentation. The controller is responsible for accepting scanner input from the codes on those printed cards and causing the presentation software to display the appropriate electronic slides.

The converter is a standalone program that reads a file created by presentation authoring software, such as POWERPOINT®, from Microsoft®, and creates a document, such as MICROSOFT WORD®, containing the content of the presentation in a layout suitable for printing on card stock. Each card represents the content of one slide and contains up to four elements: a thumbnail of the slide image, printed speech notes input to the converter, the slide number in the sequence of the presentation file, and a computer readable identification code, such as a barcode, indicating the presentation file and slide number for the corresponding slide.

The converter re-sizes and positions these elements in the output document so that the image will fit neatly and readably on the card stock. A number of different layouts are available. The converter also saves a copy of the presentation in a central location, with a filename consistent with the card identification code, and records its actions in a central log. The converter is implemented in VISUAL BASIC FOR APPLICATIONS (VBA), using VISUAL BASIC primitives to extract elements from POWERPOINT presentations and manipulate them in WORD. After the converter runs, the printed cards can be used to control a presentation through the controller. The converter uses VISUAL BASIC FOR APPLICATIONS (VBA) methods for accessing the POWERPOINT controllable objects in each slide. For each controllable element, e.g., media clip, animation sequence, it records the screen location of the element and the type of the controllable object.

The controller has a client-server architecture. The client side accepts inputs from a barcode reader. The server side carries out commands to operate the POWERPOINT presentation.

The client is implemented in VISUAL BASIC. The client runs remotely and communicates with the server PC through a TCP network interface. The client inputs data from the barcode reader attached to the keyboard port or to the serial input (RS232C) port of the client PC. The inputs from the barcode reader include the filename of the POWERPOINT file, and the slide number, or special control commands, such as merging multiple slides into one composite slide, changing the background color of slides, or stopping the presentation. The client translates the inputs from the barcode reader into presentation-control commands and sends them to the server.

If the client receives inputs to perform actions associated with controllable objects from the barcode reader or micro device(s) attached to the control identification-carrying device, then the client generates a mouse event at the screen location recorded by the converter. This causes POWERPOINT to have the controllable objects take the appropriate action, e.g., step animation, play and/or pause video. This approach is not necessary if all controllable display objects are reachable directly through the MICROSOFT® APPLICATION PROGRAMMING INTERFACE (API), in which case the appropriate API call is made.

The server is implemented in VBA. The server runs on a PC and controls a POWERPOINT application running on the same PC. The video monitor output from the server PC goes to a presentation device. The server waits for network connections from clients. Once a client connects, it sends presentation control requests to the server. VISUAL BASIC primitives allow the server to control POWERPOINT presentations. For example, the server can direct the presentation to load a specified POWERPOINT presentation file, jump to a specified slide, go to the next or previous slide, stop the POWERPOINT slide show, and so on.

While the systems and methods of this invention have been described in relation to a presentation environment, it should be appreciated that these techniques can be applied to any program that contains accessible presentation elements and/or controllable elements such as word processing programs, intra- or Internet browsers, spreadsheets, computer-aided drafting (CAD) programs, computer-aided manufacturing (CAM) programs, decision support systems, simulation environments in general, or the like.

In general, the elements that may be controlled by the control identification carrying devices are elements that are capable of modifying their behavior, including, but not limited to, simple displayable elements such as static slide images, multimedia elements, e.g., audio clips, video clips, animation sequences, multimedia clips, elements that link to independently executable program sequences that may or may not accept additional parameters, e.g., ActiveX components, operating system calls, invocation of programming code within the presentation application, e.g., macros, scripting languages, applets, invocation of programs independent of the presentation application, e.g., dynamic link library components, drivers for input/output devices, e.g., printers, scanners, cameras, environmental or process control devices, or the like.

Additionally, parametric values of a dynamic simulations could also be associated with the identification control devices that use control identification carrying devices to invoke simulation execution or and displays for what-if analysis, audit analysis, trend prediction, or the like.

It is, therefore, apparent that there has been provided in accordance with the present invention a method and apparatus for assisting a user to present electronic media to an audience. While this invention has been described in conjunction with preferred embodiments thereof, it is evident that many alternatives, modifications, and variations be apparent to those skilled in the art. Accordingly, the Applicants intend to embrace all such alternatives, modifications or variations to follow in the spirit and scope of this invention.

What is claimed is:

1. A system that controls a presentation using a tangible, sensible identification-carrying device comprising at least one presentation element identifier that identifies at least one presentation element, the system comprising:
   a sensor that senses the at least one presentation element identifier and at least one control element identifier for controlling the presentation element identified by the at least one presentation element identifier;
   a controller that select the at least one presentation element identified by the at least one presentation element identifier and affects the presentation based on the sensed at least one control element identifier; and
   a display that displays the at least one selected presentation element.

2. The system of claim 1, further comprising a memory that stores at least one of the at least one presentation element, the at least one presentation element identifier, at least one control element and the at least one control element identifier.

3. The system of claim 2, further comprising an identification controller the associates the at least one control element identifier and the at least one control element.

4. The system of claim 2, wherein one or more control element identifiers are associated with the at least one control element.

5. The system of claim 1, further comprising a presentation controller that retrieves the at last one presentation element.

6. The system of claim 1, wherein the sensor is at least one of a scanner, a bar code reader, an electronic sensing device, an electromechanical sensing device, an inductive sensing device, a capacitive sensing device, a microchip reader, a micro machine device reader, a micro electromechanical device reader, or an ultrasonic reader.

7. The system of claim 1, wherein the display is at least one of an overhead projector, a television, a large screen television, a video projector, a slide projector or a monitor.

8. The system of claim 1, wherein the tangible, sensible identification-carrying device is at least one of a printed media, an electronic device, a capacitive device, an inductive device, an electromechanical device, a micro machine, a micro electromechanical device, an ultrasonic transmitting device, or a microchip.

9. A method for controlling a presentation using physical objects comprising:

presenting to a sensor a tangible, sensible identification-carrying device comprising at least one presentation element identifier that identifies at least one presentation element and at least one control element identifier that identifies at least one control element for the at least one presentation element identified by the at least one presentation element identifier;

sensing the at least one presentation element identifier and the at least one control element identifier;

selecting the at least one presentation element identified by the at least one presentation element identifier;

affecting the presentation based on the sensed control element identifier; and displaying the at least and selected presentation element.

10. The method of claim 9, further comprising associating the at least one control element identified by the at least one control element identifier based on a mapping data structure.

11. The method of claim 9, wherein the tangible, sensible identification-carrying device further comprises at least one mnemonic.

12. The method of claim 2, wherein the sensor is at least one of a scanner, a bar code reader, an electronic sensing device, an electromechanical sensing device, an inductive sensing device, a capacitive sensing device, a microchip reader, a micro machine device reader, a micro electromechanical device reader or an ultrasonic reader.

13. The method of claim 9, wherein the tangible, sensible identification-carrying device is at least one of a printed media, an electronic device, a capacitive device, an inductive device, an electromechanical device, a micro machine, a micro electromechanical device, an ultrasonic transmitting device or a microchip.

14. The method of claim 9, further comprising displaying the at least one selected presentation element on at least one of an overhead projector, a television, a large screen television, a video projector, a slide projector or a monitor.

15. The method of claim 9, further comprising:

monitoring the sensed at least one control element identifier, and modifying the affecting step.

16. A system that generates physical objects usable to control a presentation, comprising:

a controller that associates at least one control element with at least one control element identifier;

a generator that provides a tangible, sensible identification-carrying device with the at least one control element identifier that identifies a function associated with the at least one control element for controlling at least one presentation element identified by at least on presentation element identifier; and a memory that stores at least one of the at least one presentation element, at least one presentation element identifier, the at least one control element identifier and the at least one control element.

17. The system of claim 16, wherein the generator is at least one of a printer, a bar code writer, an electronic device, an electromechanical device, an inductive device, a capacitive storing device, a microchip burner, a micro machine device writer, a micro electromechanical device writer or an ultrasonic transmitting device.

18. The system of claim 16, wherein the tangible, sensible identification-carrying device is at least one of a printed media, an electronic device, a capacitive device, an inductive device, an electromechanical device, a micro machine, a micro electromechanical device, an ultrasonic transmitting device, or a microchip.

19. The system of claim 16, wherein the tangible, sensible identification-carrying device further comprises at least one mnemonic.

20. A system that controls a presentation using a tangible, sensible identification-carrying device comprising at least one presentation element identifier that identifies at least one presentation element, the system comprising:

a sensor that senses the at least one presentation element identifer and it least one control element identifier;

a controller that selects the at least one presentation element identified by the presentation identifier and affects the presentation of the at least one presentation element based on the sensed at least one control element identifier other than by visual modification of the identified at least one presentation element; and a display that displays the at least one presentation element.

21. A method for controlling a presentation using physical objects comprising:

presenting to a sensor a tangible, sensible identification-carrying device comprising at least one presentation element identifier that identifies at least one presentation element and at least one control element identifier that identifies at least one control element for the at least one presentation element identified by the at least one presentation element identifier;

sensing the at least one presentation element identifier and the at least one control element identifier;

selecting the at least one presentation element identified by the at least one presentation element identifier;

affecting the presentation other than by visual modification of the selected presentation element, based on the sensed control element identifier; and displaying the at least one selected presentation element.

* * * * *